United States Patent
Baker et al.

(10) Patent No.: US 6,572,679 B2
(45) Date of Patent: Jun. 3, 2003

(54) GAS SEPARATION USING ORGANIC-VAPOR-RESISTANT MEMBRANES IN CONJUNCTION WITH ORGANIC-VAPOR-SELECTIVE MEMBRANES

(75) Inventors: Richard W. Baker, Palo Alto, CA (US); Ingo Pinnau, Palo Alto, CA (US); Zhenjie He, Fremont, CA (US); Andre R. Da Costa, Menlo Park, CA (US); Ramin Daniels, San Jose, CA (US); Karl D. Amo, Mountain View, CA (US); Johannes G. Wijmans, Menlo Park, CA (US)

(73) Assignee: Membrane Technology and Research, Inc., Menlo Park, CA (US)

(*) Notice: Subject to any disclaimer, the term of this patent is extended or adjusted under 35 U.S.C. 154(b) by 0 days.

(21) Appl. No.: 10/105,861

(22) Filed: Mar. 25, 2002

(65) Prior Publication Data
US 2002/0152889 A1 Oct. 24, 2002

Related U.S. Application Data

(63) Continuation-in-part of application No. 09/574,420, filed on May 19, 2000, now Pat. No. 6,361,583, and a continuation-in-part of application No. 09/574,303, filed on May 19, 2000, now Pat. No. 6,361,582.

(51) Int. Cl.[7] .................. B01D 53/22; B01D 53/047
(52) U.S. Cl. .................. 95/47; 95/50; 95/51; 95/54; 95/55; 95/96
(58) Field of Search .................. 95/45, 47–55, 95/96–106; 96/4–14

(56) References Cited

U.S. PATENT DOCUMENTS

| | | | |
|---|---|---|---|
| 3,133,132 A | 5/1964 | Loeb et al. | 264/49 |
| 3,308,107 A | 3/1967 | Selman et al. | 260/87.5 |
| 3,488,335 A | 1/1970 | Braun | 260/88.3 |
| 3,798,185 A | 3/1974 | Skiens et al. | 260/2.5 |
| 3,865,845 A | 2/1975 | Resnick | 260/340.9 |
| 4,119,417 A | * 10/1978 | Heki et al. | 55/158 |
| 4,130,403 A | * 12/1978 | Cooley et al. | 55/16 |
| 4,180,388 A | * 12/1979 | Graham et al. | 55/16 |
| 4,180,552 A | * 12/1979 | Graham et al. | 423/359 |
| 4,230,463 A | 10/1980 | Henis et al. | 55/16 |
| 4,243,701 A | 1/1981 | Riley et al. | 427/244 |
| 4,264,338 A | * 4/1981 | Null | 55/16 |
| 4,399,264 A | 8/1983 | Squire | 526/247 |
| 4,431,786 A | 2/1984 | Squire | 526/247 |
| 4,435,191 A | * 3/1984 | Graham | 55/16 |
| 4,553,983 A | 11/1985 | Baker | 55/16 |
| 4,565,855 A | 1/1986 | Anderson et al. | 526/247 |
| 4,594,399 A | 6/1986 | Anderson et al. | 526/247 |

(List continued on next page.)

FOREIGN PATENT DOCUMENTS

| | | | |
|---|---|---|---|
| EP | 0649676 | 4/1995 | B01D/67/00 |
| JP | 1043329 | 2/1989 | B01D/55/22 |

OTHER PUBLICATIONS

I. Pinnau et al., "Gas and Vapor Transport Properties of Amorphous Perfluorinated Copolymer Membranes . . . ," J. Membrane Science, 109, p. 125–133 (1996).

(List continued on next page.)

Primary Examiner—Robert H. Spitzer
(74) Attorney, Agent, or Firm—J. Farrant

(57) ABSTRACT

A process for treating a gas mixture containing at least an organic compound gas or vapor and a second gas, such as natural gas, refinery off-gas or air. The process uses two sequential membrane separation steps, one using membrane selective for the organic compound over the second gas, the other selective for the second gas over the organic vapor. The second-gas-selective membranes use a selective layer made from a polymer having repeating units of a fluorinated polymer, and demonstrate good resistance to plasticization by the organic components in the gas mixture under treatment, and good recovery after exposure to liquid aromatic hydrocarbons. The membrane steps can be combined in either order.

66 Claims, 9 Drawing Sheets

U.S. PATENT DOCUMENTS

| | | | | |
|---|---|---|---|---|
| 4,597,777 A | * | 7/1986 | Graham | 55/16 |
| 4,639,257 A | * | 1/1987 | Duckett et al. | 55/16 |
| 4,685,940 A | | 8/1987 | Soffer et al. | 55/158 |
| 4,754,009 A | | 6/1988 | Squire | 526/247 |
| 4,863,761 A | | 9/1989 | Puri | 427/175 |
| 4,880,442 A | | 11/1989 | Hayes | 55/16 |
| 4,894,068 A | * | 1/1990 | Rice | 55/16 |
| 4,897,457 A | | 1/1990 | Nakamura et al. | 526/247 |
| 4,910,276 A | | 3/1990 | Nakamura et al. | 526/247 |
| 4,931,070 A | * | 6/1990 | Prasad | 55/16 |
| 5,021,602 A | | 6/1991 | Clement et al. | 558/230 |
| 5,044,166 A | | 9/1991 | Wijmans et al. | 62/85 |
| 5,051,114 A | | 9/1991 | Nemser et al. | 55/16 |
| 5,089,033 A | * | 2/1992 | Wijmans | 55/16 |
| 5,102,432 A | * | 4/1992 | Prasad | 55/16 |
| 5,117,272 A | | 5/1992 | Nomura et al. | 357/52 |
| 5,141,642 A | | 8/1992 | Kusuki et al. | 210/490 |
| 5,156,888 A | | 10/1992 | Haubs et al. | 427/163 |
| 5,199,962 A | | 4/1993 | Wijmans et al. | 55/16 |
| 5,242,636 A | | 9/1993 | Sluma et al. | 264/45.8 |
| 5,268,411 A | | 12/1993 | Yokotsuka et al. | 524/462 |
| 5,281,255 A | | 1/1994 | Toy et al. | 95/50 |
| 5,282,969 A | * | 2/1994 | Xu | 210/640 |
| 5,318,417 A | | 6/1994 | Kopp et al. | 425/97 |
| 5,332,424 A | | 7/1994 | Rao et al. | 95/47 |
| 5,401,300 A | * | 3/1995 | Lokhandwala et al. | 95/49 |
| 5,407,466 A | | 4/1995 | Lokhandwala et al. | 95/49 |
| 5,407,467 A | * | 4/1995 | Lokhandwala et al. | 95/49 |
| 5,498,682 A | | 3/1996 | Navarrini et al. | 526/247 |
| 5,510,406 A | | 4/1996 | Matsuo et al. | 524/237 |
| 5,538,536 A | | 7/1996 | Fuentes et al. | 95/45 |
| 5,556,449 A | * | 9/1996 | Baker et al. | 95/49 |
| 5,558,698 A | * | 9/1996 | Baker et al. | 95/49 |
| 5,647,227 A | | 7/1997 | Lokhandwala | 62/624 |
| 5,669,958 A | | 9/1997 | Baker et al. | 95/50 |
| 5,707,423 A | | 1/1998 | Pinnau et al. | 95/45 |
| 5,710,345 A | | 1/1998 | Navarrini et al. | 568/596 |
| 5,883,177 A | | 3/1999 | Colaianna et al. | 524/462 |
| 5,962,612 A | | 10/1999 | Takakura et al. | 526/249 |
| 6,040,419 A | | 3/2000 | Drysdale et al. | 528/408 |
| 6,053,965 A | * | 4/2000 | Lokhandwala | 95/49 |
| 6,168,649 B1 | * | 1/2001 | Jensvold et al. | 95/47 |
| 6,361,582 B1 | * | 3/2002 | Pinnau et al. | 95/45 |
| 6,361,583 B1 | * | 3/2002 | Pinnau et al. | 95/45 |
| 6,425,267 B1 | * | 7/2002 | Baker et al. | 62/624 |

OTHER PUBLICATIONS

A. Alentiev et al., "High Transport Parameters and Free Volume of Perfluorodioxole Copolymers," J. Membrane Science, 126, p. 123–132 (1997).

V. Arcella et al., "A Study on a Perfluoropolymer Purification and Its Application to Membrane Formation," J. Membrane Science, 163, p. 203–209 (1999).

J. Henis, "Chapter 10—Commercial and Practical Aspects of Gas Separation Membranes," in *Polymeric Gas Separation Membranes,* Paul and Yampol'skii (eds.), CRC Press (1994).

S. Ando et al., "Perfluorinated Polymers for Optical Waveguides," Chemtech, Dec. 1994, p. 20–27.

D. L. Roberts, "The Behavior of a Membrane–Membrane Hybrid," Proceedings of the Sixth Annual Meeting of the North American Membrane Society, Breckenridge, CO, May 1994.

* cited by examiner

GAS SEPARATION USING ORGANIC-VAPOR-RESISTANT MEMBRANES IN CONJUNCTION WITH ORGANIC-VAPOR-SELECTIVE MEMBRANES

This application is a continuation-in-part of Ser. No. 09/574,420, filed May 19, 2000, now U.S. Pat. No. 6,361,583, and Ser. No. 09/574,303 filed May 19, 2000, now U.S. Pat. No. 6,361,582, both of which are incorporated herein by reference in their entirety.

FIELD OF THE INVENTION

The invention relates to the separation of gases from gas mixtures containing organic components. The separation is carried out using hydrocarbon-resistant membranes in conjunction with hydrocarbon-selective membranes, and is useful in refineries, petrochemical plants, natural gas fields and the like.

BACKGROUND OF THE INVENTION

Polymeric gas-separation membranes are well known and are in use in such areas as production of oxygen-enriched air, production of nitrogen from air, separation of carbon dioxide from methane, hydrogen recovery from various gas mixtures and removal of organic vapors from air or nitrogen.

The preferred membrane for use in any gas-separation application combines high selectivity with high flux. Thus, the membrane-making industry has engaged in an ongoing quest for polymers and membranes with improved selectivity/flux performance. Many polymeric materials are known that offer intrinsically attractive properties. That is, when the permeation performance of a small film of the material is measured under laboratory conditions, using pure gas samples and operating at modest temperature and pressure conditions, the film exhibits high permeability for some pure gases and low permeability for others, suggesting useful separation capability.

Unfortunately, gas separation in an industrial plant is seldom so simple. The gas mixtures to which the separation membranes are exposed may be hot, contaminated with solid or liquid particles, or at high pressure, may fluctuate in composition or flow rate or, more likely, may exhibit several of these features. Even in the most straightforward situation possible, where the gas stream to be separated is a two-component mix, uncontaminated by other components, at ambient temperature and moderate pressure, one component may interact with the membrane in such a way as to change the permeation characteristics of the other component, so that the separation factor or selectivity suggested by the pure gas measurements cannot be achieved.

In gas mixtures that contain condensable components, it is frequently, although not always, the case that the mixed gas selectivity is lower, and at times considerably lower, than the ideal selectivity. The condensable component, which is readily sorbed into the polymer matrix, swells or, in the case of a glassy polymer, plasticizes the membrane, thereby reducing its selective capabilities. A technique for predicting mixed gas performance under real conditions from pure gas measurements with any reliability has not yet been developed.

A good example of these performance problems is the separation of hydrogen from mixtures containing hydrogen, methane and other hydrocarbons. Increasing reliance on low-hydrogen, high-sulfur crudes, coupled with tighter environmental regulations, has raised hydrogen demand in refineries. This is primarily due to increased hydrodesulfurization and hydrocracking; as a result many refineries are now out of balance with respect to hydrogen supply. At the same time, large quantities of hydrogen-containing off-gas from refinery processes are currently rejected to the refinery's fuel gas systems. Besides being a potential source of hydrogen, these off-gases contain hydrocarbons of value, for example, as liquefied petroleum gas (LPG) and chemical feedstocks.

The principal technologies available to recover hydrogen from these off-gases are cryogenic separation, pressure swing adsorption (PSA), and membrane separation. Membrane gas separation, the newest, is based on the difference in permeation rates of gas components through a selective membrane. Many membrane materials are much more permeable to hydrogen than to other gases and vapors. One of the first applications of gas separation membranes was recovery of hydrogen from ammonia plant purge streams, which contain hydrogen and nitrogen. This is an ideal application for membrane technology, because the membrane selectivity is high, and the feed gas is clean (free of contaminants, such as heavier hydrocarbons). Another successful application is to adjust hydrogen/carbon monoxide or hydrogen/methane ratios for synthesis gas production. Again, the feed gas is free of heavy hydrocarbon compounds.

Application of membranes to refinery separation operations has been much less successful. Refinery gas streams contain contaminants such as water vapor, acid gases, olefins, aromatics, and other organics. At relatively low concentrations, these contaminants cause membrane plasticization and loss of selectivity. At higher concentrations they can condense on the membrane and cause irreversible damage to it.

When a feedstream containing such components and hydrogen is introduced into a membrane system, the hydrogen is removed from the feed gas into the permeate and the gas remaining on the feed side becomes progressively enriched in hydrocarbons, raising the dewpoint. For example, if the total hydrocarbon content increases from 60% in the feed gas to 85% in the residue gas, the dewpoint may increase by as much as 25° C. or more, depending on hydrocarbon mix. Maintaining this hydrocarbon-rich mixture as gas may require it to be maintained at high temperature, such as 60° C., 70° C., 80° C. or even higher, which is costly and may itself eventually adversely affect the mechanical integrity of the membrane. Failure to do this means the hydrocarbon stream may enter the liquid-phase region of the phase diagram before it leaves the membrane module, and condense on the membrane surface, damaging it beyond recovery.

Even if the hydrocarbons are kept in the gas phase, separation performance may fall away completely in the presence of hydrocarbon-rich mixtures. These issues are discussed, for example, in J. M. S. Henis, "Commercial and Practical Aspects of Gas Separation Membranes" Chapter 10 of D. R. Paul and Y. P. Yampol'skii, *Polymeric Gas Separation Membranes*, CRC Press, Boca Raton, 1994. This reference gives upper limits on various contaminants in streams to be treated by polysulfone membranes of 50 psi hydrogen sulfide, 5 psi ammonia, 10% saturation of aromatics, 25% saturation of olefins and 11° C. above paraffin dewpoint (pages 473–474).

A great deal of research has been performed on improved membrane materials for hydrogen separation. A number of these materials appear to have significantly better properties than the original cellulose acetate or polysulfone membranes. For example, modern polyimide membranes have been reported with selectivity for hydrogen over methane of 50 to 200, as in U.S. Pat. Nos. 4,880,442 and 5,141,642. Unfortunately, these materials appear to remain susceptible to severe loss of performance through plasticization and to catastrophic collapse if contacted by liquid hydrocarbons. Several failures have been reported in refinery applications where these conditions occur. This low process reliability has caused a number of process operators to discontinue use of membrane separation for hydrogen recovery.

Another example of an application in which membranes have difficulty delivering and maintaining adequate performance is the removal of carbon dioxide from natural gas. Natural gas provides more than one-fifth of all the primary energy used in the United States, but much raw gas is "subquality", that is, it exceeds the pipeline specifications in nitrogen, carbon dioxide and/or hydrogen sulfide content. In particular, about 10% of gas contains excess carbon dioxide.

Membrane technology is attractive for removing this carbon dioxide, because many membrane materials are very permeable to carbon dioxide, and because treatment can be accomplished using the high wellhead gas pressure as the driving force for the separation. However, carbon dioxide readily sorbs into and interacts strongly with many polymers, and in the case of gas mixtures such as carbon dioxide/methane with other components, the expectation is that the carbon dioxide at least will have a swelling or plasticizing effect, thereby adversely changing the membrane permeation characteristics. These issues are again discussed in the Henis reference cited above.

In the past, cellulose acetate, which can provide a carbon dioxide/methane selectivity of about 10–20 in gas mixtures at pressure, has been the membrane material of choice for this application, and about 100 plants using cellulose acetate membranes are believed to have been installed. Nevertheless, cellulose acetate membranes are not without problems. Natural gas often contains substantial amounts of water, either as entrained liquid, or in vapor form, which may lead to condensation within the membrane modules. However, contact with liquid water can cause the membrane selectivity to be lost completely, and exposure to water vapor at relative humidities greater than only about 20–30% can cause irreversible membrane compaction and loss of flux. The presence of hydrogen sulfide in conjunction with water vapor is also damaging, as are high levels of $C_{3+}$ hydrocarbons. These issues are discussed in more detail in U.S. Pat. No. 5,407,466, columns 2–6, which patent is incorporated herein by reference.

A related problem is the treatment of nitrogen-rich natural gas. Fourteen percent of known U.S. natural gas reserves contain more than 4% nitrogen, making them out of specification in this regard, and many of these streams also contain excess carbon dioxide.

Cryogenic distillation is the only process that has been used to date on any scale to remove nitrogen from natural gas, but cryogenic plants are costly and complicated, and the feed gas requires very thorough pre-treatment.

The problem is also a very difficult one for membrane separation, owing to the low nitrogen/methane selectivity of essentially all membrane materials, which is exacerbated by the plasticizing effects of carbon dioxide in the gas mixture. In addition, many materials that are somewhat selective for one gas over the other have very low permeability.

It was discovered a few years ago that operating silicone rubber membranes at low temperatures can increase the methane/nitrogen selectivity to as high as 5 or above. U.S. Pat. Nos. 5,669,958 and 5,647,227 make use of this discovery and disclose low-temperature methane/nitrogen separation processes using silicone rubber or similar membranes to preferentially permeate methane and reject nitrogen. However, such a selectivity is obtained only at very low temperatures, typically −60° C., for example.

Yet another challenging area is the separation of mixtures of light hydrocarbon vapors. For example, olefins, particularly ethylene and propylene, are important chemical feedstocks. About 17.5 million tons of ethylene and 10 million tons of propylene are produced in the United States annually, much as a by-product of petrochemical processing. Before they can be used, the raw olefins must be separated from mixtures containing saturated hydrocarbons and other components.

Currently, separation of olefin/paraffin mixtures is usually carried out by distillation. The low relative volatilities of the components make this process costly and complicated; distillation columns are typically up to 300 feet tall and the process is very energy-intensive. More economical separation processes are needed. Using a membrane to separate olefins from paraffins is an alternative to distillation that has been considered. However, the separation is difficult because of the similar molecular sizes and condensabilities of the components, as well as the challenge of operating the membranes in a hydrocarbon-rich environment, and no material that can provide adequate performance with real vapor mixtures under pressure has been found.

Finally, air streams contaminated with diverse volatile organic compounds (VOCs) are found throughout industry. Such streams arise when organic liquids are stored or transferred, during use of VOCs as solvents for adhesives, paints or coatings, as exhaust from solvent cleaning operations, and so on. In many cases, such stream can be treated effectively to separate the VOCs from air or nitrogen using rubbery, organic-selective membranes, as taught in U.S. Pat. No. 4,553,983. However, some streams contain too much or too little VOC to yield both a clean air stream and a high purity recovered VOC stream.

Thus, the need remains for membranes that will provide and maintain adequate performance under the conditions of exposure to organic vapors, and particularly $C_{3+}$ hydrocarbons, that are commonplace in refineries, chemical plants, or gas fields.

Films or membranes made from fluorinated polymers having a ring structure in the repeat unit are known. For example:

1. U.S. Pat. Nos. 4,897,457 and 4,910,276, both to Asahi Glass, disclose various perfluorinated polymers having repeating units of perfluorinated cyclic ethers, and cite the gas-permeation properties of certain of these, as in column 8, lines 48–60 of U.S. Pat. No. 4,910,276.
2. A paper entitled "A study on perfluoropolymer purification and its application to membrane formation" (V. Arcella et al., *Journal of Membrane Science*, Vol. 163, pages 203–209 (1999)) discusses the properties of membranes made from a copolymer of tetrafluoroethylene and a dioxole. Gas permeation data for various gases are cited.
3. European Patent Application 0 649 676 A1, to L'Air Liquide, discloses post-treatment of gas separation membranes by applying a layer of fluoropolymer, such as a perfluorinated dioxole, to seal holes or other defects in the membrane surface.
4. U.S. Pat. No. 5,051,114, to Du Pont, discloses gas separation methods using perfluoro-2,2-dimethyl-1,3-dioxole polymer membranes. This patent also discloses comparative data for membranes made from perfluoro(2-methylene-4-methyl-1,3-dioxolane) polymer (Example XI).

5. A paper entitled "Gas and vapor transport properties of amorphous perfluorinated copolymer membranes based on 2,2-bistrifluoromethyl-4,5-difluoro-1,3-dioxole/tetrafluoroethylene" (I. Pinnau et al., *Journal of Membrane Science*, Vol. 109, pages 125–133 (1996)) discusses the free volume and gas permeation properties of fluorinated dioxole/tetrafluoroethylene copolymers compared with substituted acetylene polymers. This reference also shows the susceptibility of this dioxole polymer to plasticization by organic vapors and the loss of selectivity as vapor partial pressure in a gas mixture increases (FIGS. 3 and 4).

Most of the data reported in the prior art references listed above are for permanent gases, carbon dioxide and methane, and refer only to measurements made with pure gases. The data reported in item 5 indicate that even these fluorinated polymers, which are characterized by their chemical inertness, appear to be similar to conventional hydrogen-separating membranes in their inability to withstand exposure to propane and heavier hydrocarbons.

Another issue is that membranes are efficient at making bulk separations of components, but are generally less competitive if one or the other product stream must be delivered at high purity. Thus, it is often desirable to combine membrane separation with another separation operation to achieve the desired separation result.

As one illustration, it is known, at least in the literature, to combine two membrane separation steps using membranes of unlike separation characteristics. For example, U.S. Pat. No. 5,538,536 discloses the use for the separation of hydrogen from hydrocarbons of two membranes of different selectivity in series. U.S. Pat. No. 5,044,166 describes the use of a nitrogen-selective membrane followed by a refrigerant-selective membrane for treating purge streams from industrial refrigerators. U.S. Pat. No. 5,199,962 also mentions the possibility of using different membranes types together in a separation of condensable vapors, such as organics, from other gases. Japanese Patent JP 1043329 discloses a natural gas treatment process by a combination of an organic-selective silicone rubber membrane and a carbon-dioxide-selective cellulose acetate membrane. A paper by D. L. Roberts given at the Sixth Annual meeting of the North American Membrane Society describes combinations of glassy and rubbery polymer membranes for separating toluene from air, for example.

SUMMARY OF THE INVENTION

The invention is a process for separating a gaseous mixture containing a gaseous hydrocarbon and at least a second gas. Such a mixture might typically, but not necessarily, be found as a process or waste stream from a petrochemical plant or a refinery, as a natural gas stream or as air discharged from operations that use, store or transfer volatile organic compounds (VOCs).

The mixture to be treated is frequently a multicomponent mixture, containing (in addition to the two components to be separated), other gaseous hydrocarbons, nitrogen or other inert gases, carbon dioxide, hydrogen, oxygen or water vapor, for example.

The separation is carried out by running a stream of the gas mixture through at least two sequential membrane separation steps of unlike selectivity. One of the membrane separation steps is carried out using membranes selective in favor of the hydrocarbon over the second gas; the other membrane separation step is carried out using membranes selective in favor of the second gas over the hydrocarbon.

The process typically results in two product streams, one rich in hydrocarbon, the other rich in the second gas, with other streams being recirculated within the process. In some cases, however, more than two product streams may be produced.

The process differs from processes previously available in the art in that the membranes used for the step selective in favor of the second gas:

(i) are able to maintain useful separation properties in the presence of organic vapors, particularly $C_{3+}$ hydrocarbon vapors, even at high levels in the gas mixture, (ii) can recover from accidental exposure to liquid organic compounds, and (iii) have unusually good selectivity in combination with high flux for hard-to-separate gas/hydrocarbon pairs, such as nitrogen/methane.

To provide these attributes, the membranes selective for the second gas are made from a glassy polymer or copolymer. The polymer is characterized by having repeating units of a fluorinated, cyclic structure, the ring having at least five members. The polymer is further characterized by a fractional free volume no greater than about 0.3 and preferably by a glass transition temperature, Tg, of at least about 100° C. Preferably, the polymer is perfluorinated.

In the alternative, the membranes selective for the second gas are characterized in terms of their selectivity before and after exposure to liquid hydrocarbons. Specifically, the membranes have a post-exposure selectivity for the second gas over the gaseous hydrocarbon from which it is desired to separate the second gas, after exposure of the separation membrane to a liquid hydrocarbon, for example, toluene, and subsequent drying, that is at least about 60%, 65% or even 70% of a pre-exposure selectivity for the second gas over the gaseous hydrocarbon, the pre- and post-exposure selectivities being measured with a test gas mixture of the same composition and under like conditions.

In this case, the selective layer is again made from an amorphous glassy polymer or copolymer with a fractional free volume no greater than about 0.3 and a glass transition temperature, Tg, of at least about 100° C. The polymer is fluorinated, generally heavily fluorinated, by which we mean having a fluorine:carbon ratio of atoms in the polymer of at least about 1:1. Preferably, the polymer is perfluorinated. In this case the polymer need not incorporate a cyclic structure.

Therefore, in a basic embodiment, the process of the invention includes the following membrane separation step using membranes selective for the second gas over the gaseous hydrocarbon:

(a) bringing a multicomponent gas mixture comprising a gaseous hydrocarbon and a second gas into contact with the feed side of a separation membrane having a feed side and a permeate side, the membrane having a selective layer comprising:

a polymer comprising repeating units having a fluorinated cyclic structure of an at least 5-member ring, the polymer having a fractional free volume no greater than about 0.3;

(b) providing a driving force for transmembrane permeation;

(c) withdrawing from the permeate side a permeate stream enriched in the second gas compared to the gas mixture;

(d) withdrawing from the feed side a residue stream depleted in the second gas compared to the gas mixture.

In the alternative, a basic embodiment of the process includes the following membrane separation step using membranes selective for the second gas over the gaseous hydrocarbon:

(a) bringing a multicomponent gas mixture comprising a gaseous hydrocarbon and a second gas into contact with the feed side of a separation membrane having a feed side and a permeate side, the membrane having a selective layer comprising a polymer having:
  (i) a ratio of fluorine to carbon atoms in the polymer greater than 1:1;
  (ii) a fractional free volume no greater than about 0.3; and
  (iii) a glass transition temperature of at least about 100° C.; and the separation membrane being characterized by a post-exposure selectivity for the second gas over the gaseous hydrocarbon, after exposure of the separation membrane to liquid toluene and subsequent drying, that is at least about 65% of a pre-exposure selectivity for the second gas over the gaseous hydrocarbon, as measured pre- and post-exposure with a test gas mixture of the same composition and under like conditions;
(b) providing a driving force for transmembrane permeation;
(c) withdrawing from the permeate side a permeate stream enriched in the second gas compared to the gas mixture;
(d) withdrawing from the feed side a residue stream depleted in the second gas compared to the gas mixture.

A basic embodiment of the invention also includes the following membrane separation step using membranes selective for the gaseous hydrocarbon over the second gas:
(a) bringing a multicomponent gas mixture comprising a gaseous hydrocarbon and a second gas into contact with the feed side of a separation membrane having a feed side and a permeate side, the membrane comprising a selective layer that is selective in favor of the gaseous hydrocarbon over the second gas:
(b) providing a driving force for transmembrane permeation;
(c) withdrawing from the permeate side a permeate stream enriched in the gaseous hydrocarbon compared to the gas mixture;
(d) withdrawing from the feed side a residue stream depleted in the gaseous hydrocarbon compared to the gas mixture.

The step selective for the second gas and the step selective for the gaseous hydrocarbon may be combined in any combination, with the gaseous hydrocarbon selective step preceding the second gas selective step or vice versa. Either the residue or the permeate from the first step may provide the feed to the second step.

Thus, there are four basic combination process schemes:
A. Raw gas fed first to hydrocarbon-selective step; residue stream passed as feed to the second-gas selective step;
B. Raw gas fed first to hydrocarbon-selective step; permeate stream passed as feed to the second-gas selective step;
C. Raw gas fed first to the second-gas selective step; residue stream passed as feed to the hydrocarbon-selective step;
D. Raw gas fed first to the second-gas selective step; permeate stream passed as feed to the hydrocarbon-selective step.

Therefore, in a basic embodiment, the process of the invention according to scheme A includes the following steps:
(a) providing a first membrane unit containing a first membrane having a first feed side and a first permeate side, the first membrane being selective in favor of the gaseous hydrocarbon over the second gas;
(b) providing a second membrane unit containing a second membrane having a second feed side and a second permeate side, the second membrane being selective in favor of the second gas over the gaseous hydrocarbon, and including a selective layer comprising a polymer comprising repeating units having a fluorinated cyclic structure of an at least 5-member ring, the polymer having a fractional free volume no greater than about 0.3;
the second membrane unit being connected in series with the first membrane unit such that gas leaving the first feed side can enter the second membrane unit on the second feed side,
(c) passing a gas mixture comprising a gaseous hydrocarbon and a second gas into the first membrane unit and across the first feed side;
(d) providing a first driving force for transmembrane permeation;
(e) withdrawing from the first feed side a first residue stream depleted in the gaseous hydrocarbon compared with the gas mixture;
(f) withdrawing from the first permeate side a first permeate stream enriched in the gaseous hydrocarbon compared with the gas mixture;
(g) passing the first residue stream into the second membrane unit and across the second feed side;
(h) providing a second driving force for transmembrane permeation;
(i) withdrawing from the second feed side a second residue stream depleted in the second gas compared with the first residue stream;
(j) withdrawing from the second permeate side a second permeate stream enriched in the second gas compared with the first residue stream.

In the alternative, a basic embodiment of the process of the invention according to scheme A includes the following steps:
(a) providing a first membrane unit containing a first membrane having a first feed side and a first permeate side, the first membrane being selective in favor of the gaseous hydrocarbon over the second gas;
(b) providing a second membrane unit containing a second membrane having a second feed side and a second permeate side, the second membrane being selective in favor of the second gas over the gaseous hydrocarbon, and including a selective layer comprising a polymer having:
  (i) a ratio of fluorine to carbon atoms in the polymer greater than 1:1;
  (ii) a fractional free volume no greater than about 0.3; and
  (iii) a glass transition temperature of at least about 100° C.;
  and the second membrane being characterized by a post-exposure selectivity for the second gas over the gaseous hydrocarbon, after exposure of the separation membrane to liquid toluene and subsequent drying, that is at least about 65% of a pre-exposure selectivity for the second gas over the gaseous hydrocarbon, as measured pre- and post-exposure with a test gas mixture of the same composition and under like conditions;
the second membrane unit being connected in series with the first membrane unit such that gas leaving the first feed side can enter the second membrane unit on the second feed side,
(c) passing a gas mixture comprising a gaseous hydrocarbon and a second gas into the first membrane unit and across the first feed side;
(d) providing a first driving force for transmembrane permeation;
(e) withdrawing from the first feed side a first residue stream depleted in the gaseous hydrocarbon compared with the gas mixture;
(f) withdrawing from the first permeate side a first permeate stream enriched in the gaseous hydrocarbon compared with the gas mixture;
(g) passing the first residue stream into the second membrane unit and across the second feed side;
(h) providing a second driving force for transmembrane permeation;

(i) withdrawing from the second feed side a second residue stream depleted in the second gas compared with the first residue stream;

(j) withdrawing from the second permeate side a second permeate stream enriched in the second gas compared with the first residue stream.

According to scheme C, a basic embodiment of the process of the invention includes the following steps:

(a) providing a first membrane unit containing a first membrane having a first feed side and a first permeate side, the first membrane being selective in favor of the second gas over the gaseous hydrocarbon, and including a selective layer comprising a polymer comprising repeating units having a fluorinated cyclic structure of an at least 5-member ring, the polymer having a fractional free volume no greater than about 0.3;

(b) providing a second membrane unit containing a second membrane having a second feed side and a second permeate side, the second membrane being selective in favor of the gaseous hydrocarbon over the second gas;

the second membrane unit being connected in series with the first membrane unit such that gas leaving the first feed side can enter the second membrane unit on the second feed side, (c) passing a gas mixture comprising a gaseous hydrocarbon and a second gas into the first membrane unit and across the first feed side;

(d) providing a first driving force for transmembrane permeation;

(e) withdrawing from the first feed side a first residue stream depleted in the second gas compared with the gas mixture;

(f) withdrawing from the first permeate side a first permeate stream enriched in the second gas compared with the gas mixture;

(g) passing the first residue stream into the second membrane unit and across the second feed side;

(h) providing a second driving force for transmembrane permeation;

(i) withdrawing from the second feed side a second residue stream depleted in the gaseous hydrocarbon compared with the first residue stream;

(j) withdrawing from the second permeate side a second permeate stream enriched in the gaseous hydrocarbon compared with the first residue stream.

In the alternative, a basic embodiment of the process of the invention according to scheme C includes the following steps:

(a) providing a first membrane unit containing a first membrane having a first feed side and a first permeate side, the first membrane being selective in favor of the second gas over the gaseous hydrocarbon, and including a selective layer comprising a polymer having:

(i) a ratio of fluorine to carbon atoms in the polymer greater than 1:1;

(ii) a fractional free volume no greater than about 0.3; and (iii) a glass transition temperature of at least about 100° C.;

and the first membrane being characterized by a post-exposure selectivity for the second gas over the gaseous hydrocarbon, after exposure of the separation membrane to liquid toluene and subsequent drying, that is at least about 65% of a pre-exposure selectivity for the second gas over the gaseous hydrocarbon, as measured pre- and post-exposure with a test gas mixture of the same composition and under like conditions;

(b) providing a second membrane unit containing a second membrane having a second feed side and a second permeate side, the second membrane being selective in favor of the gaseous hydrocarbon over the second gas;

the second membrane unit being connected in series with the first membrane unit such that gas leaving the first feed side can enter the second membrane unit on the second feed side, (c) passing a gas mixture comprising a gaseous hydrocarbon and a second gas into the first membrane unit and across the first feed side;

(d) providing a first driving force for transmembrane permeation;

(e) withdrawing from the first feed side a first residue stream depleted in the second gas compared with the gas mixture;

(f) withdrawing from the first permeate side a first permeate stream enriched in the second gas compared with the gas mixture;

(g) passing the first residue stream into the second membrane unit and across the second feed side;

(h) providing a second driving force for transmembrane permeation;

(i) withdrawing from the second feed side a second residue stream depleted in the gaseous hydrocarbon compared with the first residue stream;

(j) withdrawing from the second permeate side a second permeate stream enriched in the gaseous hydrocarbon compared with the first residue stream.

According to scheme B, a basic embodiment of the process of the invention includes the following steps:

(a) providing a first membrane unit containing a first membrane having a first feed side and a first permeate side, the first membrane being selective in favor of the gaseous hydrocarbon over the second gas;

(b) providing a second membrane unit containing a second membrane having a second feed side and a second permeate side, the second membrane being selective in favor of the second gas over the gaseous hydrocarbon, and including a selective layer comprising a polymer comprising repeating units having a fluorinated cyclic structure of an at least 5-member ring, the polymer having a fractional free volume no greater than about 0.3;

the second membrane unit being connected in series with the first membrane unit such that gas leaving the first permeate side can enter the second membrane unit on the second feed side, (c) passing a gas mixture comprising a gaseous hydrocarbon and a second gas into the first membrane unit and across the first feed side;

(d) providing a first driving force for transmembrane permeation;

(e) withdrawing from the first feed side a first residue stream depleted in the gaseous hydrocarbon compared with the gas mixture;

(f) withdrawing from the first permeate side a first permeate stream enriched in the gaseous hydrocarbon compared with the gas mixture;

(g) passing the first permeate stream into the second membrane unit and across the second feed side;

(h) providing a second driving force for transmembrane permeation;

(i) withdrawing from the second feed side a second residue stream depleted in the second gas compared with the first permeate stream;

(j) withdrawing from the second permeate side a second permeate stream enriched in the second gas compared with the first permeate stream.

In the alternative, a basic embodiment of the process of the invention according to scheme B includes the following steps:

(a) providing a first membrane unit containing a first membrane having a first feed side and a first permeate side, the first membrane being selective in favor of the gaseous hydrocarbon over the second gas;

(b) providing a second membrane unit containing a second membrane having a second feed side and a second permeate side, the second membrane being selective in favor of the second gas over the gaseous hydrocarbon, and including a selective layer comprising a polymer having:
  (i) a ratio of fluorine to carbon atoms in the polymer greater than 1:1;
  (ii) a fractional free volume no greater than about 0.3; and
  (iii) a glass transition temperature of at least about 100° C.;
  and the second membrane being characterized by a post-exposure selectivity for the second gas over the gaseous hydrocarbon, after exposure of the separation membrane to liquid toluene and subsequent drying, that is at least about 65% of a pre-exposure selectivity for the second gas over the gaseous hydrocarbon, as measured pre- and post-exposure with a test gas mixture of the same composition and under like conditions;
  the second membrane unit being connected in series with the first membrane unit such that gas leaving the first permeate side can enter the second membrane unit on the second feed side, (c) passing a gas mixture comprising a gaseous hydrocarbon and a second gas into the first membrane unit and across the first feed side;

(d) providing a first driving force for transmembrane permeation;

(e) withdrawing from the first feed side a first residue stream depleted in the gaseous hydrocarbon compared with the gas mixture;

(f) withdrawing from the first permeate side a first permeate stream enriched in the gaseous hydrocarbon compared with the gas mixture;

(g) passing the first permeate stream into the second membrane unit and across the second feed side;

(h) providing a second driving force for transmembrane permeation;

(i) withdrawing from the second feed side a second residue stream depleted in the second gas compared with the first permeate stream;

(j) withdrawing from the second permeate side a second permeate stream enriched in the second gas compared with the first permeate stream.

According to scheme D, a basic embodiment of the process of the invention includes the following steps:

(a) providing a first membrane unit containing a first membrane having a first feed side and a first permeate side, the first membrane being selective in favor of the second gas over the gaseous hydrocarbon, and including a selective layer comprising a polymer comprising repeating units having a fluorinated cyclic structure of an at least 5-member ring, the polymer having a fractional free volume no greater than about 0.3;

(b) providing a second membrane unit containing a second membrane having a second feed side and a second permeate side, the second membrane being selective in favor of the gaseous hydrocarbon over the second gas;

the second membrane unit being connected in series with the first membrane unit such that gas leaving the first permeate side can enter the second membrane unit on the second feed side, (c) passing a gas mixture comprising a gaseous hydrocarbon and a second gas into the first membrane unit and across the first feed side;

(d) providing a first driving force for transmembrane permeation;

(e) withdrawing from the first feed side a first residue stream depleted in the second gas compared with the gas mixture;

(f) withdrawing from the first permeate side a first permeate stream enriched in the second gas compared with the gas mixture;

(g) passing the first permeate stream into the second membrane unit and across the second feed side;

(h) providing a second driving force for transmembrane permeation;

(i) withdrawing from the second feed side a second residue stream depleted in the gaseous hydrocarbon compared with the first permeate stream;

(j) withdrawing from the second permeate side a second permeate stream enriched in the gaseous hydrocarbon compared with the first permeate stream.

In the alternative, a basic embodiment of the process of the invention according to scheme D includes the following steps:

(a) providing a first membrane unit containing a first membrane having a first feed side and a first permeate side, the first membrane being selective in favor of the second gas over the gaseous hydrocarbon, and including a selective layer comprising a polymer having:
  (i) a ratio of fluorine to carbon atoms in the polymer greater than 1:1;
  (ii) a fractional free volume no greater than about 0.3; and
  (iii) a glass transition temperature of at least about 100° C.;
  and the first membrane being characterized by a post-exposure selectivity for the second gas over the gaseous hydrocarbon, after exposure of the separation membrane to liquid toluene and subsequent drying, that is at least about 65% of a pre-exposure selectivity for the second gas over the gaseous hydrocarbon, as measured pre- and post-exposure with a test gas mixture of the same composition and under like conditions;

(b) providing a second membrane unit containing a second membrane having a second feed side and a second permeate side, the second membrane being selective in favor of the gaseous hydrocarbon over the second gas;

the second membrane unit being connected in series with the first membrane unit such that gas leaving the first permeate side can enter the second membrane unit on the second feed side, (c) passing a gas mixture comprising a gaseous hydrocarbon and a second gas into the first membrane unit and across the first feed side;

(d) providing a first driving force for transmembrane permeation;

(e) withdrawing from the first feed side a first residue stream depleted in the second gas compared with the gas mixture;

(f) withdrawing from the first permeate side a first permeate stream enriched in the second gas compared with the gas mixture;

(g) passing the first permeate stream into the second membrane unit and across the second feed side;

(h) providing a second driving force for transmembrane permeation;

(i) withdrawing from the second feed side a second residue stream depleted in the gaseous hydrocarbon compared with the first permeate stream;

(j) withdrawing from the second permeate side a second permeate stream enriched in the gaseous hydrocarbon compared with the first permeate stream.

All of these combinations have utility in the gas separation industry.

The second gas that may be separated from gaseous hydrocarbons by the processes of the invention includes, but is not limited to, hydrogen, nitrogen, oxygen, air, argon, helium, carbon dioxide, hydrogen sulfide, water vapor, methane, ethane, light olefins and paraffins and light hydrocarbon isomers. Thus, in addition to inorganic gases, the second gas may itself be a light hydrocarbon gas.

Gaseous hydrocarbons from which the second gas may be separated include, but are not limited to, paraffins, both straight and branched, for example, methane, ethane, propane, butanes, pentanes, hexanes; olefins and other aliphatic unsaturated organics, for example, ethylene, propylene, butene; aromatic hydrocarbons, for example, benzene, toluene, xylenes; vapors of halogenated compounds, amines, alcohols and ketones; and diverse other volatile organic compounds. In many cases, the gas mixture to be treated contains a multiplicity of these components.

Particularly preferred membrane materials for the membranes selective in favor of the second gas are amorphous homopolymers of perfluorinated dioxole, dioxolanes or cyclic alkyl ethers, or copolymers of these with tetrafluoroethylene. Specific most preferred materials are copolymers having the structure:

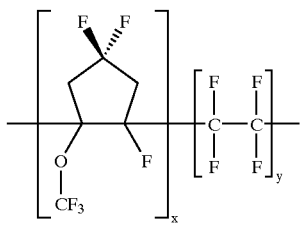

where x and y represent the relative proportions of the dioxole and the tetrafluoroethylene blocks, such that x+y=1.

A second highly preferred material has the structure:

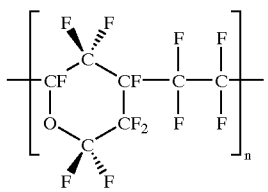

where n is a positive integer.

Contrary to what would be expected from the data presented in the Pinnau et al. *Journal of Membrane Science* paper, we have unexpectedly found that membranes formed from fluorinated cyclic polymers as characterized above can withstand exposure to $C_{3+}$ hydrocarbons well enough to provide useful separation capability for gas mixtures that include $C_{3+}$ hydrocarbon vapors. This resistance persists even when the $C_{3+}$ hydrocarbons are present at high levels, such as 5%, 10%, 15% or even more.

A particularly important advantage of the invention is that the membranes can retain selectivity for the desired second gas, such as hydrogen, nitrogen, carbon dioxide, methane, or light olefin, even in the presence of streams rich in, or even essentially saturated with, $C_{3+}$ hydrocarbon vapors. This distinguishes these membrane materials from all other membrane materials previously used commercially for such separations.

Membranes made from fluorinated dioxoles have been believed previously to behave like conventional membrane materials in suffering from debilitating plasticization in a hydrocarbon containing environment, to the point that they may even become selective for hydrocarbons over permanent gas even at moderate $C_{3+}$ hydrocarbon partial pressures. We have discovered that this is not the case for the membranes taught herein. This unexpected result is achieved because the membranes used in the invention are unusually resistant to plasticization by hydrocarbon vapors.

The membranes are also resistant to contact with liquid hydrocarbons, in that they are able to retain their selectivity in favor of the second gas after prolonged exposure to liquid toluene, for example. This is a second beneficial characteristic that differentiates the processes of the invention from prior art processes. In the past, exposure of the membranes to liquid hydrocarbons frequently meant that the membranes were irreversibly damaged and had to be removed and replaced.

Besides withstanding exposure during use, their resistance to hydrocarbons enables the membranes and modules to be cleaned with hydrocarbon solvents to remove oils or other organic materials that may have been deposited during operation. This is an additional and beneficial improvement over processes previously available in the art.

These unexpected and unusual attributes render the process of the invention useful, not only in situations where commercial gas separation membranes have been used previously, but also in situations where it was formerly difficult or impractical for membrane separation to be used, or where membrane lifetimes were poor.

Because the preferred polymers for the membranes selective in favor of the second gas are glassy and rigid, an unsupported film of the polymer may be usable in principle as a single-layer gas separation membrane. However, such a layer will normally be far too thick to yield acceptable transmembrane flux, and in practice, the separation membrane usually comprises a very thin selective layer that forms part of a thicker structure, such as an asymmetric membrane or a composite membrane. The making of these types of membranes is well known in the art.

If the membrane is a composite membrane, the support layer may optionally be made from a fluorinated polymer also, making the membrane a totally fluorinated structure and enhancing chemical resistance. The membrane may take any form, such as hollow fiber, which may be potted in cylindrical bundles, or flat sheets, which may be mounted in plate-and-frame modules or formed into spiral-wound modules.

The other membrane separation step is carried out using membranes selective in favor of the gaseous hydrocarbon over the second gas. Any membrane that provides such properties may be used. Several types of membranes are known that meet this criterion, including rubbery membranes, so-called "super-glassy" polymers, that exhibit anomalous behavior for glassy materials in that they preferentially permeate larger, more condensable molecules over smaller, less condensable molecules, and inorganic membranes, such as microporous carbon or ceramic membranes.

The membranes for this separation step may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties. If super-glassy membranes are used, they may be formed as integral asymmetric or composite membranes.

A driving force for permeation in both membrane separation steps is provided by the pressure difference between the feed and permeate sides, which can be generated in a variety of ways. The pressure difference may be provided by compressing the feed stream, drawing a vacuum on the permeate side, or a combination of both. Both membrane types are able to tolerate high feed pressures, such as above 200 psia, 300 psia, 400 psia or more.

Both membrane types are able to operate satisfactorily in the presence of water, carbon dioxide and $C_{3+}$ hydrocarbons. Therefore, even in processes where the membrane separation step selective for the second gas precedes the hydrocarbon-selective step, the partial pressure of the hydrocarbons in the feed may be close to saturation. For example, depending on the mix of hydrocarbons and the temperature of the gas, the aggregate partial pressure of all $C_{3+}$ hydrocarbons in the gas might be as much as 10 psia, 15 psia, 25 psia, 50 psia, 100 psia, 200 psia or more. Expressed as a percentage of the saturation vapor pressure at that temperature, the partial pressure of hydrocarbons, particularly $C_{3+}$ hydrocarbons, may be 20%, 30%, 50% or even 70% or more of saturation.

The carbon dioxide partial pressure may also be relatively high, such as 25 psia, 50 psia, 100 psia or above.

With respect to the hydrocarbon-selective membranes, water, carbon dioxide and $C_{3+}$ hydrocarbons simply pass into the permeate stream along with any other preferentially permeating components, even if the membrane separation is performed at conditions close to the water or hydrocarbon dewpoints.

As mentioned above, the process of the invention has four basic combination schemes, A–D, of the two types of membrane separation step. In addition, both membrane separation steps may themselves be carried out by means of a single membrane unit or an array of two or more units in series or cascade arrangements. The processes of the invention also include combinations of the membrane separation process defined above with other separation processes, such as adsorption, absorption, distillation, condensation or yet other types of membrane separation.

The scope of the invention is not intended to be limited to any particular gas streams, but to encompass any situation where a gas stream containing a gaseous hydrocarbon and at least one second gas is to be separated. The composition of treatable gas streams varies widely, and the individual components may be present in any quantities. Thus, for example, feed gas streams may contain just a few percent gaseous hydrocarbon, or may contain 90% hydrocarbon or more. The gas may contain a single hydrocarbon component, such as methane, ethylene or a chlorinated solvent, or a mix of numerous hydrocarbons, such as $C_1$–$C_8$ hydrocarbons or heavier.

It is envisaged that the processes of the invention will be particularly useful as part of a natural gas processing train. Pipeline specification for natural gas is usually no more than about 4% nitrogen, but raw gas frequently contains more than 4% nitrogen and not infrequently contains 10% nitrogen or more. The process of the invention enables gas that is out of specification with respect to nitrogen to be brought to pipeline specification. Furthermore, since the membranes used are able to withstand other contaminants in the gas, the nitrogen removal steps may be performed upstream of other gas treatments, if required. This provides greater flexibility in plant design and operation than is often possible using prior art nitrogen separation methods.

Likewise, pipeline specification for natural gas is usually no more than about 2% carbon dioxide, but raw gas frequently contains more than 2% carbon dioxide and not infrequently contains 10% carbon dioxide or more. The processes of the invention enables gas that is out of specification with respect to carbon dioxide to be brought to pipeline specification, and brings improved plasticization resistance and design flexibility to this separation also.

Another useful application is the separation of hydrogen from mixtures containing hydrogen, methane and other hydrocarbons, often found as petrochemical plant or refinery process or waste streams. Application of membranes to hydrogen recovery from refinery and petrochemical gas mixtures has been of only limited success to date, because the present generation of hydrogen-selective membranes has difficulty withstanding water vapor, acid gases, olefins, aromatics, and other organics.

The processes described herein can be used for hydrogen separation or recovery such as from reformers, crackers, hydroprocessors and the like, even in the presence of significant amounts of $C_{3+}$ hydrocarbon or other contaminants. The processes can produce a hydrogen-rich product stream as either a high-pressure residue stream or lower pressure permeate stream, depending on whether the hydrogen product is withdrawn from the hydrogen-selective or hydrocarbon-selective membrane separation step.

Other representative, but non-limiting, applications of the processes include treatment of nitrogen-containing off-gases from polyolefin manufacturing, olefin/paraffin separations, particularly propylene from propane, treatment of waste air streams containing organic vapors, separation of permanent gases, including, argon or helium from organics, separation of methane from $C_{3+}$ organics; and separation of isomers from one another.

It is an object of the present invention to provide a membrane-based process for separation of gases from gas mixtures containing gaseous hydrocarbons.

Additional objects and advantages of the invention will be apparent from the description below to those of ordinary skill in the art.

It is to be understood that the above summary and the following detailed description are intended to explain and illustrate the invention without restricting its scope.

DETAILED DESCRIPTION OF THE INVENTION

Figure 1:
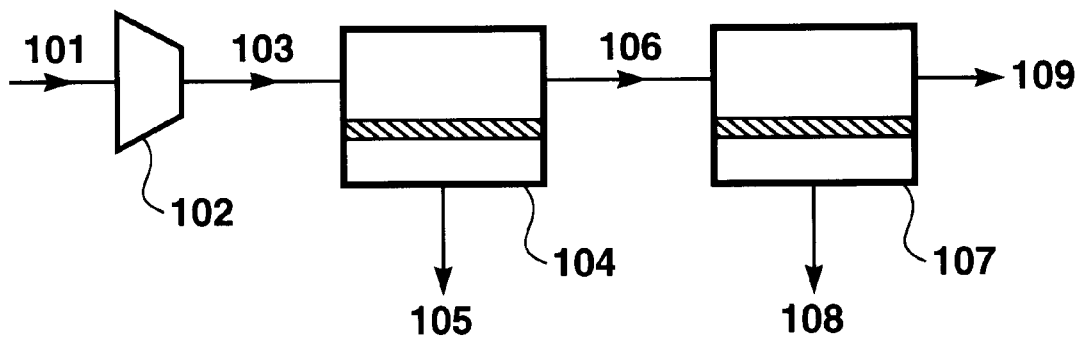
FIG. 1 is a schematic representation of the invention in a basic two-step form.

The term gas as used herein means a gas or a vapor.

The terms hydrocarbon and organic vapor or organic compound are used interchangeably herein, and include, but are not limited to, saturated and unsaturated compounds of hydrogen and carbon atoms in straight chain, branched chain and cyclic configurations, including aromatic configurations, as well as compounds containing oxygen, hydrogen, halogen or other atoms.

The term $C_{2+}$ hydrocarbon means a hydrocarbon having at least two carbon atoms; the term $C_{3+}$ hydrocarbon means a hydrocarbon having at least three carbon atoms; and so on.

The terms light hydrocarbon and light olefin refer to molecules having no more than about six carbon atoms.

The term heavier hydrocarbon means a $C_{3+}$ hydrocarbon.

The terms two-step and multistep as used herein with regard to a membrane separation unit mean an arrangement of membrane modules or banks of membrane modules connected together such that the residue stream from one module or bank of modules becomes the feedstream for the next.

The terms two-stage and multistage as used herein with regard to a membrane separation unit mean an arrangement of membrane modules or banks of membrane modules connected together such that the permeate stream from one module or bank of modules becomes the feedstream for the next.

All percentages herein are by volume unless otherwise stated.

The invention is a process for separating a gaseous mixture containing a gaseous hydrocarbon and at least a second gas. Such a mixture might typically, but not necessarily, be found as a process or waste stream from a petrochemical plant or a refinery, as a natural gas stream, or as a waste air stream, for example. The mixture to be treated is frequently a multicomponent mixture, containing (in addition to the two components to be separated), other gaseous hydrocarbons, other inorganic gases or water vapor, for example.

The separation is carried out by running a stream of the gas mixture through at least two sequential membrane separation steps. One of the membrane separation steps is carried out using membranes selective in favor of the hydrocarbon over the second gas; the other membrane separation step is carried out using membranes selective in favor of the second gas over the hydrocarbon.

The process typically results in two product streams, one rich in hydrocarbon, the other rich in the second gas, with other streams being recirculated within the process. In some cases, however, more than two product streams may be produced.

The scope of the invention is not limited to any particular gas streams, but encompasses any situation where a gas stream containing a gaseous organic component and a second gas is to be treated. The composition of the gas may vary widely, by way of non-limiting examples, from a mixture that contains a minor amount of hydrocarbon, such as 1%, in admixture with air, to a purely hydrocarbon mix of $C_{1-8}$ components.

The second gas that may be separated from gaseous hydrocarbons by the process includes, but is not limited to, hydrogen, nitrogen, oxygen, air, argon, helium, carbon dioxide, hydrogen sulfide, water vapor, methane, ethane, light olefins and paraffins and light hydrocarbon isomers. Thus, in addition to inorganic gases, the second gas may itself be a light hydrocarbon gas.

Gaseous hydrocarbons from which the second gas may be separated include, but are not limited to, paraffins, both straight and branched, for example, methane, ethane, propane, butanes, pentanes, hexanes; olefins and other aliphatic unsaturated organics, for example, ethylene, propylene, butene; aromatic hydrocarbons, for example, benzene, toluene, xylenes; vapors of halogenated compounds, amines, alcohols and ketones; and diverse other volatile organic compounds. In many cases, the gas mixture to be treated contains a multiplicity of these components.

Where the gases to be separated from each other are both hydrocarbon gases, such as methane and propane, for example, the heavier or more condensable component is referred to as the gaseous hydrocarbon and the lighter or less condensable component is referred to as the second gas.

Besides the gaseous organic compound and the second gas from which it is to be separated, the gas may contain any other components. Representative, but non-limiting examples of gases or vapors that may be found in the gas mixture to be treated include acid gases, such as carbon dioxide or hydrogen sulfide; water vapor; inert gases, such as argon or helium; other permanent gases, such as oxygen, nitrogen or hydrogen; carbon monoxide; methane and $C_{2+}$ hydrocarbons, such as paraffins, olefins, aromatics, alcohols, halogenated compounds, and so on.

The feed gas mixture to be separated often contains multiple hydrocarbon components in addition to a non-organic component, such as nitrogen or hydrogen. The goal of the process may be to separate one, some or all of these organic components from the nitrogen or hydrogen.

As one non-limiting example, the gas mixture may be raw natural gas containing methane, ethane, $C_{3-8}$ hydrocarbons, hydrogen sulfide, water vapor, nitrogen and/or carbon dioxide. The process might then provide a methane-rich natural gas product, a nitrogen and/or carbon dioxide rich waste or reinjection gas, and optionally a fuel gas stream.

As a second non-limiting example, the feed gas stream may be a process or off-gas stream containing hydrogen, methane and other hydrocarbons from a hydrocracker, hydroprocessor, coking reactor, catalytic reformer, catalytic cracker, or the like. The process may then be used to separate hydrogen from the hydrocarbons to supplement or replace hydrogen supplied from other sources.

As a third non-limiting example, the feed stream may be a gas stream from a petrochemical manufacturing process, comprising a petrochemical feedstock, such as ethylene or propylene, as well as light paraffins and nitrogen or other inert gases. Such streams arise, for example, from manufacture of primary petrochemicals, chemical intermediates, fuels, polymers, agricultural chemicals and the like. The process may be used to separate unused feedstock from the inert gases or other hydrocarbons for reuse in the manufacturing operation.

As a fourth non-limiting example, the feed stream may be an off-gas stream from one of the numerous industrial processes that produce waste streams containing organic vapors in air or nitrogen. Sources of such streams include use of organic solvents in coating, spraying, cleaning, painting, or printing applications of all kinds; organic liquid storage tank vents; chemical manufacturing; and foundry cold boxes using organic catalysts for metal casting. Diverse organic vapors may be present in streams of these types, including, for example, halogenated solvents, alkyl amines, ketones or alcohols.

The process of the invention may be used to separate the oxygen and nitrogen for discharge, leaving an organic-enriched stream from which the organic solvent may be recovered for reuse.

As a fifth non-limiting example, the feed stream may be a vent gas rich in organic components, from a storage facility or elsewhere, that is to be flared. The process of the invention can be used to recapture organic components, thereby reducing the amount of valuable material that is lost by flaring.

In each case, the cut between components may be made to achieve as much separation of any specific hydrocarbon or second gas as is desired, subject of course to the relative permeabilities of the components in the mix.

The process of the invention in a basic form in which the two membrane separation steps are connected according to schemes A or C is shown in FIG. 1. Referring to this figure, a feedstream, 101, such as, but not necessarily, from one of the sources mentioned above, and comprising a gas mixture including at least one gaseous organic compound and a second gas of any kind, is passed through compression step 102 to form compressed stream 103. Step 102 is optional, and can be included or omitted depending on the existing pressure at which stream 101 is available, as discussed in more detail below.

Stream 103 passes as feed into membrane separation step 104, where it is divided into residue stream 106 and permeate stream 105. Residue stream 106 passes as feed to second membrane separation step 107, where it is divided into residue stream 109 and permeate stream 108.

For scheme A, membrane separation step 104 relies on a membrane that is selective in favor of the gaseous organic component over the second gas.

A measure of the ability of a membrane to separate two gases is the selectivity, a, defined as the ratio of the gas permeabilities, $P_1/P_2$. Selectivity can also be expressed as:

$$\alpha = D_1/D_2 \cdot k_1/k_2$$

where D is the diffusion coefficient of the gas in the membrane [cm$^2$/s], which is a measure of the gas mobility, and k is the Henry's law sorption coefficient, which links the concentration of the gas in the membrane material to the pressure in the adjacent gas [cm$^3$(STP)/cm$^3$·cmHg].

The balance between mobility selectivity and solubility selectivity is different for glassy and rubbery polymers. In glassy polymers, the diffusion term is usually dominant, permeability falls with increasing permeant size and the material is selective for small molecules over large ones. In rubbery polymers, the sorption or solubility term is usually dominant, permeability increases with increasing permeant size and the material is selective for large molecules over smaller ones. Elastomeric materials, therefore, tend to permeate larger, condensable molecules faster than small, low-boiling molecules. Thus, most rubbery materials are selective in favor of all $C_{3+}$ hydrocarbons over low-boiling point gases. Examples of polymers that can be used to make such elastomeric membranes, include, but are not limited to, nitrile rubber, neoprene, polydimethylsiloxane and related silicone polymers, chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, polyamide-polyether block copolymers, styrene/butadiene/styrene block copolymers, styrene/ethylene/butylene block copolymers, and thermoplastic polyolefin elastomers.

If a gaseous organic component of small molecular kinetic diameter and low boiling point, such as methane, is to be separated from a gas such as nitrogen or hydrogen, it is difficult to find a methane-selective membrane material of practically useful selectivity. For such separations, silicone rubber, which is one of the few polymeric materials known to be selective for methane over nitrogen and even methane over hydrogen, is the preferred membrane material. Other materials that may be suitable on a case-by-case basis include other polysiloxanes. Also, it is possible and optional to cool the incoming gas stream to achieve higher selectivity. These issues are discussed in more detail in copending patent application Ser. No. 09/917,478, now U.S. Pat. No. 6,425,267, which is incorporated herein by reference in its entirety.

The preferred membranes for step 104 permeate all of the hydrocarbons, hydrogen sulfide, carbon dioxide and water vapor preferentially, over hydrogen and nitrogen, so that they do not build up on the feed side or condense on the membrane surface. The membranes are capable of withstanding exposure to these materials even in comparatively high concentrations. As a result, they can handle a diversity of stream types including, for example, gases produced when feedstocks heavily laden with sulfur are hydroprocessed.

As a less preferred alternative, super-glassy materials, which are also known to be selective for more condensable over less condensable components in a gas mixture, may be used for step 104. Such materials and membranes made from them are described in U.S. Pat. Nos. 5,281,255 and 5,707,423, for example.

Yet another alternative is to use finely microporous inorganic membranes, such as the adsorbent carbon membranes described in U.S. Pat. No. 5,332,424, the pyrolysed carbon membranes described in U.S. Pat. No. 4,685,940, or certain ceramic membranes. These membranes are, in general, more difficult to make and less readily available than polymeric membranes, and are less preferred, although they may be useful in some circumstances.

The membrane may take any convenient form known in the art. Usually, rubbery materials do not have enough mechanical strength to be formed as unsupported membranes. Therefore, preferred embodiments incorporating rubbery selective materials involve the use of a composite membrane.

Modern composite membranes typically comprise a highly permeable but relatively non-selective support membrane, which provides mechanical strength, coated with a thin selective layer of the material that is primarily responsible for the separation properties, in this case most preferably silicone rubber.

General preparation techniques for making composite membranes of this type are well known, and are described, for example, in U.S. Pat. No. 4,243,701 to Riley et al., incorporated herein by reference. The membrane may take flat-sheet, tube or hollow-fiber form. The most preferred support membranes are those with an asymmetric structure, which provides an openly microporous under layer and a smooth, comparatively dense surface on which to coat the selective layer. Support membranes are themselves frequently cast onto a backing web of paper or fabric. As an alternative to coating onto a support membrane, it is also possible to make a composite membrane by solution-casting the polymer directly onto a non-removable backing web.

In hollow-fiber form, multilayer composite membranes may be made by a coating procedure as taught, for example, in U.S. Pat. Nos. 4,863,761; 5,242,636; and 5,156,888, or by using a double-capillary spinneret of the type taught in U.S. Pat. Nos. 5,141,642 and 5,318,417.

Additional layers may be included in the structure as desired, such as to provide strength, protect the selective layer from abrasion, and so on.

The membranes may be manufactured as flat sheets or as fibers and housed in any convenient module form, including spiral-wound modules, plate-and-frame modules and potted hollow-fiber modules. The making of all these types of membranes and modules is well known in the art. We prefer to prepare the membranes in flat-sheet form and to house them in spiral-wound modules. However, flat-sheet membranes may also be mounted in plate-and-frame modules or in any other way. If the membranes are prepared in the form of hollow fibers or tubes, they may be potted in cylindrical housings or otherwise. Since conventional polymeric materials are preferred for the membranes, they are relatively easy and inexpensive to prepare and to house in modules, compared with other types of membranes that might be used as organic-selective membranes, such as finely microporous inorganic membranes, including adsorbent carbon membranes, pyrolysed carbon membranes and ceramic membranes.

A driving force for transmembrane permeation is provided by a pressure difference between the feed and permeate sides of the membrane. This is usually achieved by an elevated pressure on the feed side. If the feed gas stream, 101, to be treated is at high pressure compared with atmospheric, such as 200 psia, 400 psia, 500 psia or above, the separation may be effected simply by making use of this high pressure to provide an adequate driving force and feed:permeate pressure ratio. Otherwise, a pressure difference can be provided by compressing the feed stream, as indicated in FIG. 1 by step 102, by drawing a vacuum on the permeate side of the membrane, or a combination of both. Polymer membranes can typically withstand pressure differences between the feed and permeate side up to about 1,500–2000 psi, so it might occasionally be necessary to let down the gas pressure before it can be fed to the membrane system. The pressure on the permeate side of the membranes may be set to any desired value.

The thickness of the selective layer is generally no thicker than about 10 $\mu$m, and typically no thicker than 5 $\mu$m. It is preferred that the selective layer be sufficiently thin that the membrane provide a pressure-normalized flux of the gaseous hydrocarbon, as measured with gas at 25° C., of at least about 50 gpu (where 1 gpu=1×10$^{-6}$ cm$^3$(STP)/cm$^2$·s·cmHg), more preferably at least about 100 gpu, and most preferably at least about 200 gpu.

Membrane separation step 104 may be carried out using one or more membrane modules in the membrane separation unit. The number of membrane modules required will vary according to the volume of gas to be treated, the composition of the feed gas, the desired compositions of the permeate and residue streams, the operating pressure of the system, and the available membrane area per module. Systems may contain as few as one membrane module or as many as several hundred or more. The modules may be housed individually in pressure vessels or multiple elements may be mounted together in a sealed housing of appropriate diameter and length.

As a result of membrane separation step 104, residue stream 106 is depleted in the gaseous hydrocarbon. For example, if the feedstream contains methane and $C_{3+}$ hydrocarbons, stream 106 is depleted in $C_{3+}$ hydrocarbons and enriched in methane compared with stream 103, and stream 105 is correspondingly enriched in $C_{3+}$ hydrocarbons and depleted in methane. Likewise, if the feedstream contains nitrogen and a chlorinated organic solvent, stream 106 is depleted in solvent and enriched in nitrogen compared with stream 103, and stream 105 is correspondingly enriched in solvent and depleted in nitrogen. If the feedstream contains hydrogen, methane and $C_{3+}$ hydrocarbons, the process parameters can be chosen so that residue stream 106 is enriched only in hydrogen, and permeate stream 105 is enriched in methane and $C_{3+}$ hydrocarbons, or alternatively so that residue stream 106 is enriched in hydrogen and methane and permeate stream 105 is enriched only in $C_{3+}$ hydrocarbons. If the feedstream contains nitrogen, carbon dioxide, methane and $C_{3+}$ hydrocarbons, depending on the composition and operating conditions, stream 106 is usually depleted in $C_{3+}$ hydrocarbons and carbon dioxide and enriched in methane and nitrogen compared with stream 103, and stream 105 is correspondingly enriched in $C_{3+}$ hydrocarbons and carbon dioxide and depleted in methane and nitrogen.

First residue stream 106 is withdrawn from the outlet of the first membrane separation step feed side and passed as feed to the feed side inlet of the second membrane separation step 107. Stream 106 will normally be at essentially the same pressure as stream 103, subject only to any small pressure drop that occurs along the length of the membrane modules in step 104. In a properly designed gas separation system, this drop should be no more than a few psi. Thus, recompression, though not explicitly excluded from the process, is not generally required before stream 106 enters step 107.

In scheme A, membrane separation step 107 relies on a membrane that is selective in favor of the second gas over the gaseous organic component. This membrane is the membrane disclosed in parent applications Ser. Nos. 09/574,420 and 09/574,303, now U.S. Pat. Nos. 6,361,583 and 6,361,582, respectively, and is characterized by having a selective layer comprising a polymer containing repeat units having a fluorinated cyclic structure of an at least 5-member ring, the polymer having a fractional free volume no greater than about 0.3. Under a pressure difference between the feed and permeate sides of the membrane, the second gas passes preferentially to the permeate side, and second gas-enriched stream, 108, is withdrawn from the permeate side. The remaining second gas-depleted, organic-compound-enriched residue stream, 109, is withdrawn from the feed side.

As disclosed in the parent applications, the separation carried out in step 107 differs from membrane operations of its type previously available in the art in that:
(i) the membranes are able to maintain useful separation properties in the presence of organic vapors, such as $C_{3+}$ hydrocarbons, even at high levels in the gas,
(ii) the membranes are able to withstand high partial pressures of carbon dioxide,
(iii) the membranes can recover from accidental exposure to liquid organic compounds, and (iv) the membranes have high second gas/hydrocarbon selectivity in conjunction with high second gas permeability.

For example, when separating nitrogen from methane, step 107 typically provides a selectivity, even in mixtures containing multiple hydrocarbons including $C_{3+}$ hydrocarbons, for nitrogen over methane of at least about 2, even if the gas mixture also contains carbon dioxide at high activity levels. Likewise, step 107 typically provides a nitrogen/$C_{3+}$ hydrocarbon selectivity of at least about 10, and a hydrogen/methane selectivity of at least about 10.

In conjunction with high selectivity, the unusually high permeability of the preferred membrane materials means that step 107 can frequently provide a transmembrane pressure-normalized gas flux of at least about 10 gpu, and sometimes higher, such as 25 gpu, 50 gpu or even higher, and in some instances as high as 100 gpu or more.

As mentioned above, to provide these desirable attributes, the membranes used in this step differ from those previously used in the art. The membranes are made from a glassy polymer, characterized by having repeating units of a fluorinated, cyclic structure, the ring having at least five members. The polymer is further characterized by a fractional free volume no greater than about 0.3 and preferably by a glass transition temperature, Tg, of at least about 100° C. Preferably, the polymer is perfluorinated.

In the alternative, the membranes are characterized in terms of their selectivity before and after exposure to liquid hydrocarbons. Specifically, the membranes have a post-exposure selectivity for the second gas over the gaseous hydrocarbon from which it is to be separated, after exposure of the separation membrane to a liquid hydrocarbon, for example, toluene, and subsequent drying, that is at least about 60%, 65% or even 70% of a pre-exposure selectivity for the second gas over the gaseous hydrocarbon, the pre- and post-exposure selectivities being measured with a test gas mixture of the same composition and under like conditions.

In applying this test to determine whether the membrane is suitable for use in the process of the invention, it is important to test the membrane itself, and not just a film of the selective layer polymer. A thick film, for example 50 μm or more thick, of the selective layer polymer may appear to resist dissolution and swelling and maintain selectivity, even when soaked for days in liquid hydrocarbon. However, when used in an asymmetric or composite membrane with a selective layer thin enough to provide useful transmembrane flux for the desired gas (which may mean a selective layer as thin as 10 μm, 5 μm, 1 μm or less), the same material may disintegrate within minutes of contact with the hydrocarbon liquid.

It is also important that the test gas mixtures used to measure the selectivity before and after exposure have essentially the same composition, and that the test be carried out under essentially the same conditions of pressure, temperature, gas flow and membrane area, since all of these parameters may have an effect on selectivity. The test gas mixture should obviously contain the second gas, for example, nitrogen, and the gaseous hydrocarbon, for example, methane, propane, ethylene or propylene, from which it is desired to separate nitrogen, but need not be identical in composition to the feed gas mixture to the process, since this may change from time to time in any case.

It is preferred that the hydrocarbon liquid to which the membrane is exposed in the test is an aromatic liquid, such as toluene, rather than a paraffin, for example, since this provides more aggressive test conditions. The test can be carried out in any convenient manner. A simple and preferred protocol is to measure the membrane selectivity using a bench-top test cell apparatus such as is familiar to those of skill in the art, remove the membrane stamp from the test cell, immerse it in liquid toluene for a period, remove it, dry it in air and retest it as before. For an adequate test, the period of immersion should be representative of the exposure that might occur during a system upset when the membrane is in use, such as one or two hours, or overnight (about eight hours).

In this case the polymer need not incorporate a cyclic structure. The selective layer is again made from an amorphous glassy polymer or copolymer with a fractional free volume no greater than about 0.3 and a glass transition temperature, Tg, of at least about 100° C. The polymer is fluorinated, generally heavily fluorinated, by which we mean having a fluorine:carbon ratio of atoms in the polymer of at least about 1:1. Preferably, the polymer is perfluorinated, even if the perfluorinated structure has a less than 1:1 fluorine:carbon ratio.

The preferred cyclic or non-cyclic polymers are not new materials in themselves. In fact, general polymer formulations embracing those suitable for use in the invention are described in patents dating back from the present day to the 1960s, for example, U.S. Pat. Nos. 3,308,107; 3,488,335; 3,865,845; 4,399,264; 4,431,786; 4,565,855; 4,594,399; 4,754,009; 4,897,457; 4,910,276; 5,021,602; 5,117,272; 5,268,411; 5,498,682; 5,510,406; 5,710,345; 5,883,177; 5,962,612; and 6,040,419.

The ring structure within the repeat units may be aromatic or non-aromatic, and may contain other atoms than carbon, such as oxygen atoms. Preferred polymers for the selective layer of the membrane are formed from fluorinated monomers of (i) dioxoles, which are five-member rings of the form

that polymerize by opening of the double bond, or (ii) dioxolanes, similar five-member rings but without the double bond in the main ring, or (iii) aliphatic structures having an alkyl ether group, polymerizable into cyclic ether repeat units with five or six members in the ring.

Not all polymers within the above structural definitions and preferences are suitable for use as membrane selective layers in the invention. For example, certain of the polymers and copolymers of perfluoro-2,2-dimethyl-1,3-dioxole reported in U.S. Pat. No. 5,051,114 have been shown to be susceptible to plasticization to the point of switching from being selective for nitrogen over hydrocarbons to being selective for hydrocarbons over nitrogen as the hydrocarbon partial pressure increases.

These polymers are, however, characterized by very high fractional free volume within the polymer, typically above 0.3. For example, a paper by A. Yu. Alentiev et al, "High transport parameters and free volume of perfluorodioxole copolymers", *Journal of Membrane Science*, Vol. 126, pages 123–132 (1997) reports fractional free volumes of 0.32 and 0.37 for two grades of perfluoro-2,2-dimethyl-1,3-dioxole copolymers (Table 1, page 125).

Likewise, these polymers are of low density compared with other polymers, such as below about 1.8 g/cm³ and are unusually gas permeable, for instance exhibiting pure gas permeabilities as high as 1,000 Barrer or more for oxygen and as high as 2,000 Barrer or more for hydrogen.

It is believed that polymers with denser chain packing, and thus lower fractional free volume, higher density and lower permeability, are more resistant to plasticization. Hence, the polymers used in the invention to form the selective, discriminating layer of the membrane should preferably be limited, in addition to the specific structural limitations defined and discussed above, to those having a fractional free volume less than about 0.3.

In referring to fractional free volume (FFV), we mean the free volume per unit volume of the polymer, defined and calculated as:

$$FFV = SFV/v_{sp}$$

where SFV is the specific free volume, calculated as:

$$SFV = v_{sp} - v_0 = v_{sp} - 1.3 v_w$$

and where:
$v_{sp}$ is the specific volume (cm³/g) of the polymer determined from density or thermal expansion measurements,
$v_0$ is the zero point volume at 0° K, and
$v_w$ is the van der Waals volume calculated using the group contribution method of Bondi, as described in D. W. van Krevelan, *Properties of Polymers*, 3$^{rd}$ Edition, Elsevier, Amsterdam, 1990, pages 71–76.

Expressed in terms of density, the selective layer polymers should preferably have a density above about 1.8 g/cm³. Expressed in terms of permeability, the selective layer polymers will generally exhibit an oxygen permeability no higher than about 300 Barrer, more typically no higher than about 100 Barrer, and a hydrogen permeability no higher than about 1,000 Barrer, more typically no higher than about 500 Barrer.

Since the polymers used for the selective layer need to remain rigid and glassy during operation, they should also have glass transition temperatures comfortably above temperatures to which they are typically exposed during the process. Polymers with glass transition temperature above about 100° C. are preferred, and, subject also to the other requirements and preferences above, the higher the glass transition temperature, in other words, the more rigid the polymer, the more preferred it is.

The polymers should preferably take amorphous, rather than crystalline form, because crystalline polymers are typically essentially insoluble and thus render membrane making difficult, as well as exhibiting low gas permeability.

As stated above, the polymers are fluorinated. More preferably, they have a fluorine:carbon ratio of atoms in the polymer of at least about 1:1, and most preferably, they are perfluorinated.

The polymers may be homopolymers of the repeating units of fluorinated cyclic structures defined above. Optionally, they may be copolymers of such repeat units with other polymerizable repeat units. For preference, these other repeat units should be at least partially fluorinated, and most preferably heavily fluorinated or perfluorinated. A number of suitable materials are known, for example, fluorinated ethers, ethylene and propylene. Particularly when perfluorinated, homopolymers made from these materials, such as polytetrafluoroethylene (PTFE) and the like, are very resistant to plasticization. However, they tend to be crystalline or semi-crystalline and to have gas permeabilities too low for any useful separation application. As constituents of copolymers with the fluorinated ring structures defined above, however, they can produce materials that combine amorphous structure, good permeability and good resistance to plasticization. Copolymers that include tetrafluoroethylene units are particularly preferred. Other specific examples of copolymers that are suitable are polyhexafluoropropylene and chlorofluoro ethylenes and propylene.

Specific most preferred materials are copolymers of tetrafluoroethylene with 2,2,4-trifluoro-5-trifluoromethoxy-1,3-dioxole having the structure:

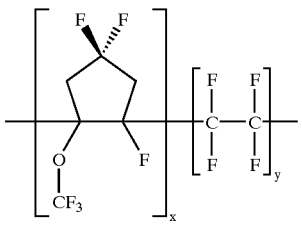

where x and y represent the relative proportions of the dioxole and the tetrafluoroethylene blocks, such that x+y=1.

Such materials are available commercially from Ausimont S.p.A., of Milan, Italy under the trade name Hyflon® AD. Different grades are available varying in proportions of the dioxole and tetrafluoroethylene units, with fluorine:carbon ratios of between 1.5 and 2, depending on the mix of repeat units. For example, grade Hyflon AD60 contains a 60:40 ratio of dioxole to tetrafluoroethylene units, has a fractional free volume of 0.23, a density of 1.93 g/cm³ and a glass transition temperature of 121° C., and grade Hyflon AD80 contains an 80:20 ratio of dioxole to tetrafluoroethylene units, has a fractional free volume of 0.23, a density of 1.92 g/cm³ and a glass transition temperature of 134° C.

A second highly preferred group of materials is the set of polyperfluoro (alkenyl vinyl ethers) including polyperfluoro (allyl vinyl ether) and polyperfluoro (butenyl vinyl ether). A specific most preferred material of this type has the structure:

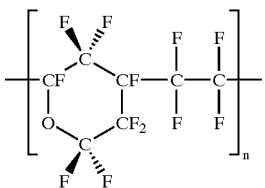

where n is a positive integer.

This material is available commercially from Asahi Glass Company, of Tokyo, Japan under the trade name Cytop®. Cytop has a fractional free volume of 0.21, a density of 2.03 g/cm³, a glass transition temperature of 108° C., and a fluorine:carbon ratio of 1.7.

A third group of materials that is believed to contain useful selective layer materials is perfluorinated polyimides. Such materials have been investigated for use as optical waveguides, and their preparation is described, for example, in S. Ando et al., "*Perfluorinated polymers for optical waveguides*", CHEMTECH, December, 1994. To be usable as membrane materials, the polyimides have to be capable of being formed into continuous films. Thus, polyimides that incorporate ether or other linkages that give some flexibility to the molecular structure are preferred.

Particular examples are polymers comprising repeat units prepared from the perfluorinated dianhydride 1,4-bis(3,4-dicarboxytrifluorophenoxy) tetrafluorobenzene (10FEDA), which has the structure:

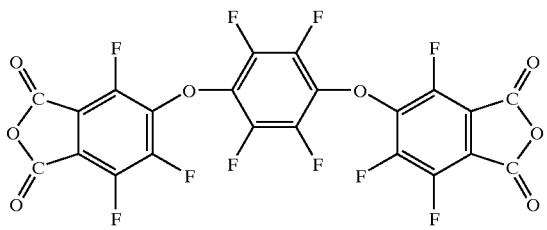

Diamines with which 10FEDA can be reacted to form polyamic acids and hence polyimides include 4FMPD, which has the structure:

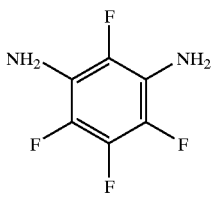

The resulting 10FEDA/4FMPD polyimide has the repeat unit structure:

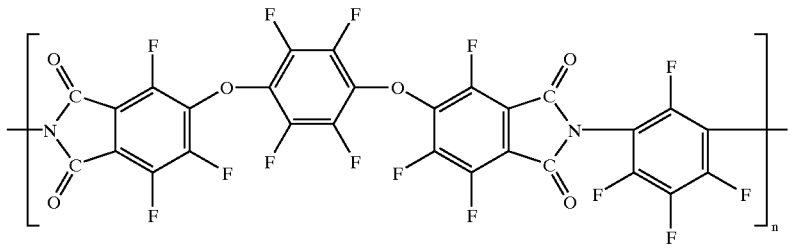

where n is a positive integer.

Yet further discussion of membrane materials is included in co-owned U.S. Pat. No. 6,361,582, entitled "Gas Separation Using $C_{3+}$ Hydrocarbon Resistant Membranes" incorporated herein by reference in its entirety.

The polymer chosen for the selective layer can be used to form films or membranes by any convenient technique known in the art, and may take diverse forms. Because the polymers are glassy and rigid, an unsupported film, tube or fiber of the polymer may be usable in principle as a single-layer membrane. In this case, our preferred method of manufacture is to prepare a solution of the polymer in a perfluorinated solvent and to cast the solution onto a glass plate or a removable or non-removable backing web, according to general casting procedures that are well known in the art. The resulting flat-sheet membrane films may be dried under ambient conditions, at elevated temperature, or under vacuum as desired to produce thin film membranes.

Alternatively, the membrane may be manufactured in the form of hollow fibers, the general methods for preparation of which are copiously described in the literature, for example in U.S. Pat. No. 3,798,185 to Skiens et al., incorporated herein by reference.

However, such single-layer films will normally be too thick to yield acceptable transmembrane flux, and in practice, the separation membrane usually comprises a very thin selective layer that forms part of a thicker structure, such as an integral asymmetric membrane, comprising a dense region that forms the separation membrane and a microporous support region. Such membranes were originally developed by Loeb and Sourirajan, and their preparation in flat sheet or hollow fiber form is now conventional in the art and is described, for example, in U.S. Pat. Nos. 3,133,132 to Loeb, and 4,230,463 to Henis and Tripodi.

As a further, and a preferred, alternative, the membrane may be a composite membrane, preferably in the form of an asymmetric support membrane, coated with a thin selective layer, and prepared as described above with respect to the rubbery gaseous-hydrocarbon-selective membranes of step 104.

Again, the membranes of step 107 may include additional layers, such as a gutter layer between the microporous support membrane and the selective layer, or a sealing layer on top of the selective layer. A gutter layer generally has two purposes. The first is to coat the support with a material that seals small defects in the support surface, and itself provides a smooth, essentially defect-free surface onto which the selective layer may be coated. The second is to provide a layer of highly permeable material that can channel permeating molecules to the relatively widely spaced pores in the support layer.

Preferred materials for the gutter layer are fluorinated or perfluorinated, to maintain high chemical resistance through the membrane structure, and of very high permeability. Particularly preferred for the gutter layer, although they are unsuitable for the selective layer, are the perfluorinated dioxole polymers and copolymers of U.S. Pat. No. 5,051,114 referred to above, having fractional free volume greater than 0.3 and extraordinarily high permeability, such as copolymers of perfluoro-2,2-dimethyl-1,3-dioxole and tetrafluoroethylene, available commercially as Teflon® AF from DuPont Fluoroproducts of Wilmington, Del. Such materials, or any others of good chemical resistance that provide protection for the selective layer without contributing significant resistance to gas transport, are also suitable as sealing layers.

Multiple selective layers may also be used. In particular, depending on the properties of the material used for the asymmetric support membrane and the porosity of the skin, the skin layer of the support may also act as a selective layer to provide a contribution to the overall selectivity of the composite.

The thickness of the selective layer or skin of the membranes can be chosen according to the proposed use, but will generally be no thicker than 10 $\mu$m, and typically no thicker than 5 $\mu$m. It is preferred that the selective layer be sufficiently thin that the membrane provide a pressure-normalized nitrogen flux, as measured with pure nitrogen gas at 25° C., of at least about 10 gpu, more preferably at least about 25 gpu and most preferably at least about 50 gpu. As mentioned above, the membranes of the invention generally provide transmembrane gas fluxes that are high compared with glassy membranes using conventional second gas-separating materials, such as polyimides, cellulose acetate and polysulfone.

Once formed, the membranes exhibit a combination of good mechanical properties, thermal stability, and high chemical resistance. The fluorocarbon polymers that form the selective layer are typically insoluble except in perfluorinated solvents and are resistant to acids, alkalis, oils, low-molecular-weight esters, ethers and ketones, aliphatic and aromatic hydrocarbons, halogenated compounds and oxidizing agents, making them suitable for use not only in the presence of $C_{3+}$ hydrocarbons, but in many other hostile environments.

As with the gaseous-hydrocarbon-selective membranes, the membranes of step 107 may be manufactured as flat sheets or as fibers and housed in any convenient module form, although flat-sheet membranes in spiral-wound modules are again the preferred choice.

Also as with the gaseous-hydrocarbon-selective membranes, the membrane separation step may use one or more membrane modules configured as desired.

The composition at which stream 106 is supplied to the membrane modules of step 107 obviously depends on the separation that has been performed in step 104. One consideration is the effect of hydrocarbons, particularly $C_{3+}$ hydrocarbons, in stream 106 on the membranes of step 107. Since step 107 is preceded by step 104, in which $C_{3+}$ hydrocarbons, if present in stream 103, tend to be preferentially removed into stream 105, stream 106 will be light in $C_{3+}$ hydrocarbons compared with streams 101 or 103.

However, unlike prior art membranes, the membranes of step 107 can maintain useful gas/hydrocarbon separation performance, in terms of transmembrane gas flux and selectivity, when exposed to high concentrations of such organics, even when the gas mixture is close to saturation with these compounds. This is true with respect to a broad range of hydrocarbons, including paraffins, olefins, aromatics, such as benzene, toluene and xylenes (BTEX), alcohols and chlorinated compounds. These properties are different from those reported in the literature for dioxole membranes, as well as obtained with prior art conventional membrane materials, such as cellulose acetate, polysulfone, or polyimides that are not perfluorinated.

Thus, it is not necessary to operate step 104 in such a way as to reduce $C_{3+}$ hydrocarbon content in stream 106 to extremely low levels, as would have been the case in the past. Even if condensation of organic liquid does accidentally occur from time to time, the membrane unit of step 107 can generally be purged with, for example, an inert gas such as nitrogen, and the membranes will frequently continue thereafter to exhibit adequate gas/hydrocarbon selectivity properties.

In contrast, prior art gas-over-hydrocarbon selective glassy membranes in commercial use are generally plasticized and irreversibly damaged by exposure to $C_{3+}$ hydrocarbon vapors at any significant concentration, such as more than about 10%, 20% or 25%, or at more modest concentrations, such as less than 10%, for prolonged periods, and cannot withstand even fleeting exposure to condensed organic liquids.

As a rough general guide, expressed as a concentration, stream 106 may have a hydrocarbons content, including $C_{3+}$ hydrocarbon vapors, of at least about 5%, 10%, 15%, 20% or higher. Expressed in terms of partial pressure, the feed stream may often be acceptable with a partial pressure of $C_{3+}$ hydrocarbons of as high as 15 psia, 25 psia, 50 psia, 100 psia or more, assuming a gas temperature of ambient or above; and the residue stream partial pressure of the $C_{3+}$ hydrocarbons together can often be as high as 50 psia, 100 psia, 150 psia or 200 psia, again assuming a temperature of ambient or above.

Expressed as the ratio of the feed pressure, P, to the saturation vapor pressure, $P_{sat}$, of the gas mixture, which is an approximate measure of the activity of the gas, the feed gas may be supplied to the membrane separation step at pressure and temperature conditions that result in the percentage $P/P_{sat}$ being at least about 25%, 30%, 50%, 60%, 70% or higher. Methane and $C_2$ components, which tend to have low boiling points, and to be less condensable and less harmful in terms of their plasticizing ability, can generally be present in any concentration.

Of course, stream 106 will usually have much lower levels of $C_{3+}$ hydrocarbons than these; nevertheless, the ability of step 107 to withstand $C_{3+}$ hydrocarbon exposure provides much greater flexibility in overall process design than would otherwise be possible.

Depending on the performance characteristics of the membranes, and the operating parameters of the system, the process can be designed for varying levels of gas purification and recovery. Single-stage gas-separation steps typically remove up to about 80–95% of the preferentially permeating component from the feed stream and produce a permeate stream significantly more concentrated in that component than the feed gas. This degree of separation is adequate for many applications. Thus, scheme A in its simplest configuration uses a single membrane separation step for step 104 and a single membrane separation step for step 107.

If the residue stream from either step, that is streams 106 and 109, requires further purification, it may be passed to a second bank of modules for a second processing step, and so on. For example, step 104 may comprise two sub-steps, as illustrated and described in more detail below, with the residue from the first sub-step being passed as feed to the second sub-step, and the residue from the second sub-step forming stream 106 to be passed to step 107. In similar manner, step 107 may be split into two sub-steps, or both steps 104 and 107 may be split into sub-steps.

Also, if the permeate stream from either step, that is streams 105 and 108, requires further treatment or concentration, it may be passed to a second bank of modules for a second-stage treatment, and so on.

Such multistage or multistep processes, and variants thereof, will be familiar to those of skill in the art, who will appreciate that the process may be configured in many possible ways, including single-stage, multistage, multistep, or more complicated arrays of two or more units in series or cascade arrangements.

In light of their unusual and advantageous properties, the membranes and processes of the invention are useful for many separation applications. Specific examples include, but are not limited to separation of permanent gases, for example, nitrogen, oxygen, air, argon or hydrogen, from organics; separation of methane from $C_{3+}$ organics; separation of carbon dioxide from organics; separation of light olefins from other organics; and separation of isomers from one another, such a n-butane from iso-butane.

By way of non-limiting example, one area where an arrangement of unlike membranes according to scheme A is useful is in the separation of hydrogen from hydrocarbons in refinery or petrochemical off-gas streams, such as those arising from hydrocrackers; hydrotreaters of various kinds, including hydrodesulfurization units; coking reactors; catalytic reformers; catalytic crackers; specific isomerization, alkylation and dealkylation units; steam reformers; hydrogenation and dehydrogenation processes; and steam crackers for olefin production.

Many of these type of operations involve feeding a hydrocarbon/hydrogen stream to a reactor, withdrawing a reactor effluent stream of different hydrocarbon/hydrogen composition, phase separating the effluent into liquid and vapor portions, and recirculating part of the vapor stream to the reactor, so as to reuse unreacted hydrogen. Such loop operations are found, for example, in the hydrotreater, hydrocracker, and catalytic reformer sections of most modem refineries, as well as in isomerization reactors and hydrodealkylation units.

In addition to hydrogen, the overhead vapor from the phase separator usually contains light hydrocarbons, particularly methane and ethane. In a closed recycle loop, these components build up, change the reactor equilibrium conditions and can lead to catalyst degradation and reduced product yield. This build-up of undesirable contaminants is usually controlled by purging a part of the vapor stream from the loop. Such a purge operation is unselective however, and, since the purge stream typically contains more hydrogen than hydrocarbons, and may contain as much as 80 vol % or more hydrogen, multiple volumes of hydrogen can be lost from the loop for every volume of contaminant that is purged.

The process of the invention according to scheme A may be used to provide a selective purge capability by treating the overhead vapor from the phase separation step, or a portion thereof. The stream passes first to step 104, where the hydrocarbon components permeate preferentially. Thus, in this case, stream 105 is a hydrocarbon-rich stream and may be returned to the cooling/phase separation steps for additional liquids recovery. The hydrogen-enriched stream 106 passes on to step 107. In this step, hydrogen permeates preferentially to form a hydrogen-rich product stream 108. The membrane area and operating conditions of step 107 can be adjusted, as is known in the art, to provide a concentration of hydrogen of, for example, 90%, 95%, 97% or more hydrogen, suitable for reuse in the reactor. Stream 109 then forms the new process purge stream, which may be sent to the plant fuel header. Such a configuration can cut the hydrogen loss with the purge stream by 50% or more, as well as providing additional LPG liquids recovery.

FIG. 1 can also be used to represent the process of the invention according to scheme C, that is, in which the raw gas is fed first to the second-gas-selective step and the residue stream from that step is passed as feed to the hydrocarbon-selective step.

In this case, referring again to the figure, a feedstream, 101, comprising a gas mixture including at least one gaseous organic compound and a second gas of any kind, is passed through optional compression step 102 to form compressed stream 103, and then as feed into membrane separation step 104. For scheme C, membrane separation step 104 relies on a membrane that is selective in favor of the second gas over the gaseous organic component.

Thus, the membranes of step 104 are of the same type as those discussed with respect to step 107 of scheme A. That is, they are the membranes disclosed in parent applications Ser. Nos. 09/574,420 and 09/574,303, now U.S. Pat. Nos. 6,361,583 and 6,361,582, respectively, and are characterized by:
(a) having a selective layer comprising a polymer containing repeat units having a fluorinated cyclic structure of an at least 5-member ring, the polymer having a fractional free volume no greater than about 0.3,
or, in the alternative,
(b) in terms of their being able to retain at least 60%, 65% or more of their original selectivity for the second gas over the gaseous hydrocarbon, after exposure to a liquid hydrocarbon.

Step 104 divides the feed gas into hydrocarbon-enriched residue stream 106 and second-gas-enriched permeate stream 105. Residue stream 106 passes as feed to second membrane separation step 107.

For scheme C, membrane separation step 107 relies on a membrane that is selective in favor of the gaseous organic component over the second gas. As discussed above, membranes that may be used for this step include rubbery membranes, super-glassy membranes or finely microporous inorganic membranes, although rubbery membranes are preferred, and silicone rubber membranes are most preferred.

Step 107 divides the feed stream 106 into hydrocarbon-enriched permeate stream 108 and second-gas-enriched residue stream 109.

As discussed with respect to scheme A above, either or both of steps 104 and 107 can themselves be made up of multiple sub-steps. For example, step 107 may comprise two sub-steps, as illustrated and described in more detail below, with the residue from the first sub-step being passed as feed to the second sub-step, and the residue from the second sub-step forming stream 109.

Also, the permeate streams from either or both steps may be passed to a further banks of modules for additional treatment.

By way of non-limiting example, one area where an arrangement of unlike membranes according to scheme C is useful is in the separation of gas that arises as a result of oil extraction by miscible flood operations. In these operations, carbon dioxide is injected into the ground at the periphery of an oil reservoir. The gas dissolves in the oil left in the pore space of the formation and lowers its viscosity. The resulting mixture is then pushed by water or gas pressure to the extraction wells. Initially the associated gas extracted with the oil is rich in methane, but over time the methane concentration falls and the carbon dioxide concentration rises, to as much as 80 or 90%. The mixture extracted from the wells is separated into recovered oil, produced water, carbon dioxide for reinjection, and condensed hydrocarbon liquids (NGL). Separation of the carbon dioxide from the methane and other hydrocarbons in the associated gas is important for the process to be economically sound.

In this case, the raw gas stream may contain large amounts of carbon dioxide, a mix of relatively heavy $C_{3+}$ hydrocarbons and only small amounts of methane. The process of the invention according to scheme C may be used to treat this associated gas to separate the carbon dioxide from the hydrocarbons.

If the stream is very rich in $C_{3+}$ hydrocarbons components, the process of the invention may include optional cooling and condensation steps upstream of step 104 to recover NGL liquids, as shown and described in the Examples section below. The associated gas then passes as feed into step 104, where carbon dioxide permeates preferentially. Thus, in this case, stream 105 is the carbon-dioxide-rich product stream, often containing as much as 90% or more carbon dioxide. This product may be reinjected.

Stream 106, enriched in hydrocarbons, passes on to step 107. In this step, $C_{3+}$ hydrocarbons permeate preferentially over methane and any remaining carbon dioxide. The $C_{3+}$ hydrocarbon rich permeate stream 108 may be cooled to produce NGL, and any uncondensed vapors may be recirculated to the front of the process. Second residue stream 109 is the most methane rich stream, and may be used as fuel gas, sent to the pipeline, or treated for additional carbon dioxide removal, as desired.

Figure 2:
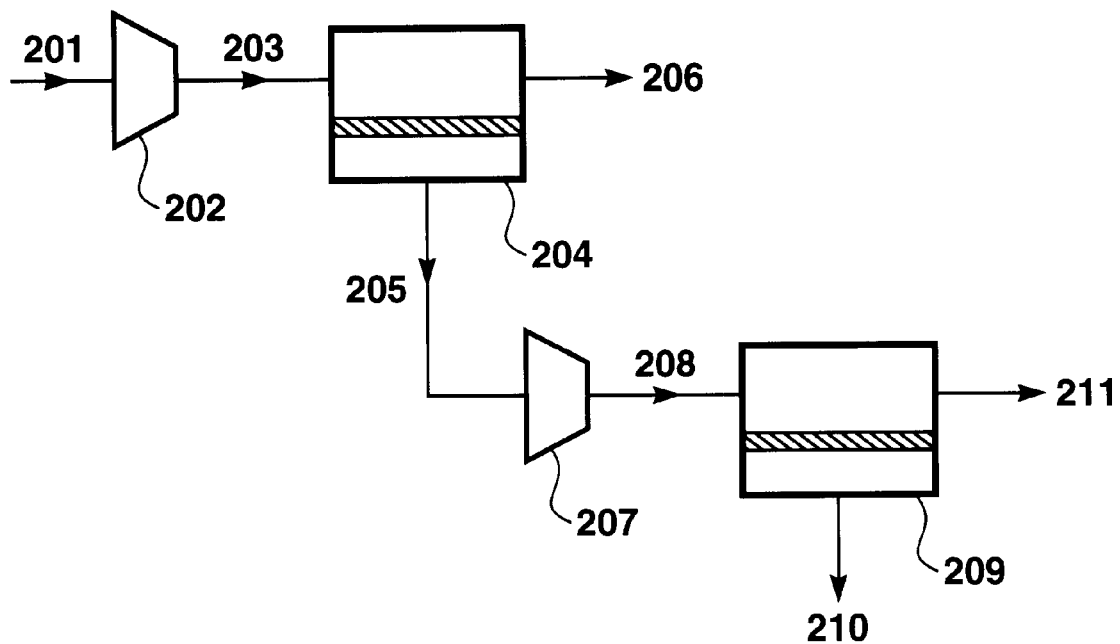
FIG. 2 is a schematic representation of the invention in a basic two-stage form.

The process of the invention in a basic form in which the two membrane separation steps are connected according to schemes B or D is shown in FIG. 2. Referring to this figure, a feedstream, 201, comprising a gas mixture including at least one gaseous organic compound and a second gas of any kind, is passed through compression step 202 to form compressed stream 203. As with the embodiments of FIG. 1, this initial compression step is optional, and will not usually be required if feed stream 201 is at a pressure of a few hundred psia or above.

Stream 203 passes as feed into membrane separation step 204, where it is divided into residue stream 206 and permeate stream 205. Permeate stream 205 is compressed in compression step 207 to form compressed stream 208. Compression step 207 is again optional, and may not be required if the permeate side of step 204 can be maintained at an intermediate high pressure. Stream 208 passes as feed to second membrane separation stage 209, where it is divided into residue stream 211 and permeate stream 210.

For scheme B, membrane separation step 204 relies on a membrane that is selective in favor of the gaseous organic component over the second gas. As discussed above, membranes that may be used for this type of step include rubbery membranes, super-glassy membranes or finely microporous inorganic membranes, although rubbery membranes are preferred, and silicone rubber membranes are most preferred.

Step 204 divides the feed stream 203 into hydrocarbon-enriched permeate stream 205 and second-gas-enriched residue stream 206.

Permeate stream 205 forms hydrocarbon-rich feed 208 to second membrane separation stage 209. The membranes of stage 209 are of the same type as those discussed with respect to step 107 of scheme A. That is, they are the membranes disclosed in parent applications Ser. Nos. 09/574,420 and 09/574,303, now U.S. Pat. Nos. 6,361,583 and 6,361,582, respectively, and are characterized by:

(a) having a selective layer comprising a polymer containing repeat units having a fluorinated cyclic structure of an at least 5-member ring, the polymer having a fractional free volume no greater than about 0.3, or, in the alternative, (b) in terms of their being able to retain at least 60%, 65% or more of their original selectivity for the second gas over the gaseous hydrocarbon, after exposure to a liquid hydrocarbon.

Stage 209 divides the feed gas 208 into hydrocarbon-enriched residue stream 211 and second-gas-enriched permeate stream 210.

As discussed with respect to schemes A and C above, either or both of steps 204 and 209 can themselves be made up of multiple sub-steps or stages. For example, step 204 may comprise two sub-steps, as illustrated and described in more detail below, with the residue from the first sub-step being passed as feed to the second sub-step, and the residue from the second sub-step forming stream 206.

By way of non-limiting example, one area where an arrangement of unlike membranes according to scheme B is useful is in the treatment of raw natural gas. Fourteen percent of known U.S. natural gas reserves contain more than 4% nitrogen, in some cases as much as 15% nitrogen, 20% nitrogen or more. Such reserves are difficult to exploit for lack of economical gas-treatment technology.

Cryogenic distillation can be used. For streams of flow rates less than about 50–100 MMscfd, however, the inherent complexity of the plant and the need for extensive pretreatment renders cryogenic technology too expensive and impractical for use.

The process of the invention according to scheme B may be used to treat gas containing as much as 15%, 20% nitrogen or more. The raw gas passes as feed into step 204, where methane and other hydrocarbons permeate preferentially to form nitrogen-depleted, hydrocarbon-enriched permeate stream 205. If the gas is very rich in nitrogen, it will often be desirable to split step 204 into two sub-steps, as illustrated in the Examples section below. The permeate from the first sub-step then forms stream 205. This stream is optionally recompressed and passed to second stage 209. Here, additional nitrogen is preferentially removed from the gas, leaving low-nitrogen residue stream 211 as a pipeline-grade natural gas product. Nitrogen-enriched permeate stream 210 may be recirculated to the front of the process. Nitrogen-rich residue stream 206 may be used as fuel gas, flared or sent for further treatment.

FIG. 2 can also be used to represent the process of the invention according to scheme D, that is, in which the raw gas is fed first to the second-gas-selective step and the permeate stream from that step is passed as feed to the hydrocarbon-selective step.

In this case, referring again to FIG. 2, membrane separation step 204 relies on a membrane that is selective in favor of the second gas over the gaseous organic component. Thus, the membranes of step 204 are again the glassy membranes disclosed in parent applications Ser. Nos. 09/574,420 and 09/574,303, now U.S. Pat. Nos. 6,361,583 and 6,361,582, respectively, and are characterized by:

(a) having a selective layer comprising a polymer containing repeat units having a fluorinated cyclic structure of an at least 5-member ring, the polymer having a fractional free volume no greater than about 0.3, or, in the alternative, (b) in terms of their being able to retain at least 60%, 65% or more of their original selectivity for the second gas over the gaseous hydrocarbon, after exposure to a liquid hydrocarbon.

Step 204 divides the feed stream 203 into hydrocarbon-enriched residue stream 206 and second-gas-enriched permeate stream 205.

Permeate stream 205 forms second-gas-rich feed 208 to second membrane separation stage 209. As discussed above, membranes that may be used for this type of step include rubbery membranes, super-glassy membranes or finely microporous inorganic membranes, although rubbery membranes are preferred, and silicone rubber membranes are most preferred.

Stage 209 divides the feed gas 208 into hydrocarbon-enriched permeate stream 210 and second-gas-enriched residue stream 211.

Yet again, as discussed with respect to schemes A, B and C above, either or both of steps 204 and 209 can themselves be made up of multiple sub-steps or stages.

By way of non-limiting example, scheme D, like scheme B, is useful is in the treatment of nitrogen-contaminated raw natural gas, especially gas that contains very large quantities of nitrogen, such as more than about 20% nitrogen.

In this case, step 204 provides a hydrocarbon-enriched permeate stream 205 and a nitrogen-enriched residue stream 206. The permeate is further processed in second stage 209 to provide a methane-rich product as stream 210.

Optionally, the processes of the invention already discussed may include other separation steps used in conjunction with the defined membrane separation process. Examples of such separation steps include adsorption, absorption, condensation, and distillation. The other separation steps may be carried out upstream, downstream or both of the membrane separation steps, that is, with reference to FIG. 1 on any of streams 101, 105, 108 and 109, and with reference to FIG. 2 on any of streams 201, 206, 210 and 211. As non-limiting examples, streams may be filtered to separate out entrained oil or water droplets, passed through a glycol absorption unit for dehydration, subjected to amine scrubbing to remove hydrogen sulfide or carbon dioxide, or cooled to condense out $C_{3+}$ hydrocarbon components.

As just one specific illustration, it is often desirable to recover $C_{3+}$ hydrocarbon components as a discrete liquid product, such as NGL. This may be achieved by including a cooling/condensation step between compression step 102 and membrane separation step 104 of FIG. 1, for example. In that case, compressed gas stream 103 is cooled, typically by air or water cooling, causing a portion of $C_{3+}$ hydrocarbons to liquefy. The stream can then be passed to a knockout pot or phase separator to recover the liquid hydrocarbon product. The remaining gas passes on to be treated according to the scheme of FIG. 1. To increase liquids recovery, the hydrocarbon enriched residue and permeate streams from step 104 and/or step 107 may be recirculated to the cooling/condensation step.

Such arrangements are often valuable in treating raw natural gas or refinery gas streams rich in $C_{3+}$ hydrocarbons components.

As just one more specific illustration, processes that include the membrane separation step combined with a pressure swing adsorption (PSA) step are within the scope of the invention. For example, membrane processes as described herein can be used to improve hydrogen recovery in several ways. The hydrogen content in low-grade fuel gas, containing typically only 30–40% hydrogen, can be upgraded to render the gas suitable for hydrogen recovery by PSA. This may be done by submitting the low-grade fuel gas to a process as described for scheme A. The hydrogen is concentrated to, for example, 60–70% hydrogen in the permeate stream 108. At this composition, stream 108 may be compressed, if necessary, and passed as feed to a PSA unit to produce high-quality hydrogen. The residue stream, 109, correspondingly depleted of hydrogen, may be sent to the fuel gas line.

Alternatively or additionally, a membrane step can be used to recover hydrogen currently lost with the tail gas when the PSA beds are regenerated. In this embodiment, a PSA tail gas stream is passed as feed stream, 101, to the membrane separation process of scheme A.

The invention is now illustrated in further detail by specific examples. These examples are intended to further clarify the invention, and are not intended to limit the scope in any way.

EXAMPLES

Examples 1–3

Refinery Off-Gas Treatment

Example 1

A computer calculation was performed with a modeling program, ChemCad V (ChemStations, Inc., Houston, Tex.), to illustrate the process of the invention according to scheme A for the recovery of hydrogen and LPG from a refinery off-gas stream that would otherwise be sent in its entirety to the fuel header. The membrane separation process was assumed to be carried out using the process design shown in FIG. 3.

In this design, the first membrane separation step, 319, was assumed to use rubbery, hydrocarbon-selective membranes as disclosed above. The second membrane separation step, corresponding to step 107 of FIG. 1, was assumed to be performed in two sub-steps, 320 and 321, both using the fluorinated hydrogen-selective membranes disclosed above. The feed stream to be treated was assumed to have the following composition:

| | |
|---|---|
| Hydrogen | 60.0% |
| Methane | 16.0% |
| Ethane | 11.7% |
| Propane | 6.7% |
| n-Butane | 5.0% |
| n-Hexane | 0.6% |

Figure 3:
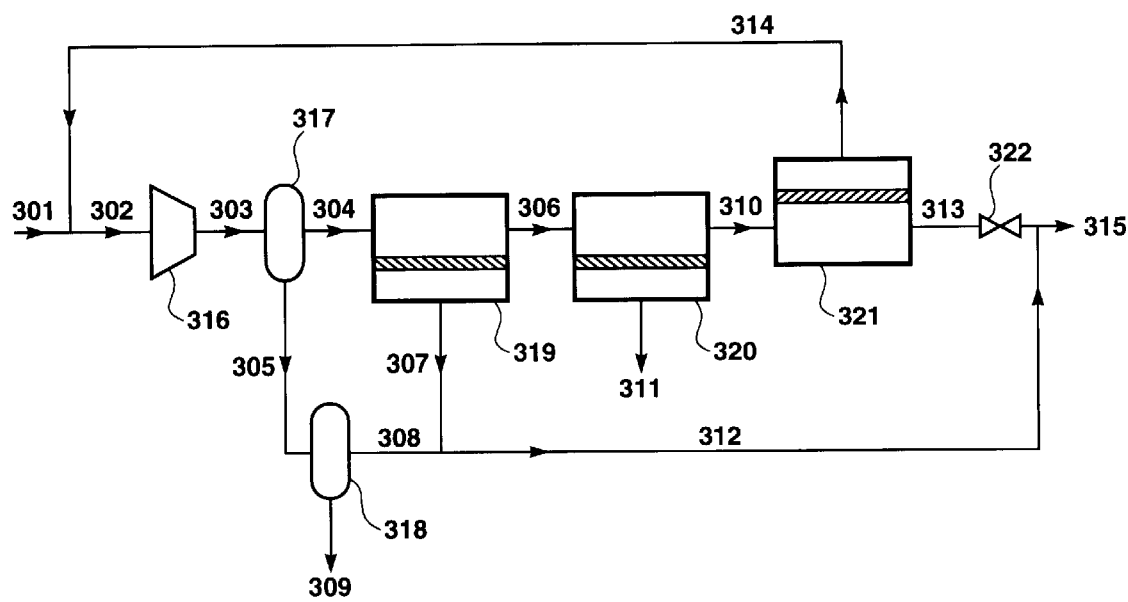
FIG. 3 is a schematic representation of a process according to scheme A using a hydrocarbon-selective membrane separation step followed by two second-gas-selective membrane separation sub-steps.

Turning now to FIG. 3, stream 301 is mixed with recycle stream 314 to form stream 302, and is compressed in compressor 316. Compressed stream 303 is cooled and passed to phase separator 317, resulting in the formation of a $C_{2+}$ hydrocarbon liquid phase, which is withdrawn as stream 305. Stream 305 is lowered in pressure to flash off the lightest components, and separated in tank or separator 318. The remaining liquid hydrocarbons are withdrawn as LPG stream 309, and light stream 308 is passed via lines 312 and 315 to the fuel gas line.

Uncondensed stream 304 is passed to membrane separation step 319, containing hydrocarbon-selective membranes. Hydrocarbon-enriched permeate stream 307 is mixed with stream 308 and passed as stream 312 and 315 to the fuel gas line. Hydrocarbon-depleted residue stream 306 is passed to second membrane separation step 320, containing hydrogen-selective membranes. Hydrogen-enriched second permeate stream 311 is withdrawn, and may be used directly or after additional purification treatment.

Hydrogen-depleted stream 310 is passed to third membrane step, 321, which was assumed to contain the same membrane as in membrane step 320. Third permeate stream 314 is recycled to the front of the process for additional hydrocarbon recovery and hydrogen purification. The third residue stream, 313, a hydrogen/mixed hydrocarbon stream, is depressurized at valve 322, then combined with stream 312 to be passed as stream 315 to the fuel header or elsewhere.

The feed gas was assumed to be at 50 psia and 30° C., and the feed flow was assumed to be 10 MMscfd. The results of the calculations are summarized in Table 1.

TABLE 1

| Stream | 301 | 302 | 303 | 304 | 305 | 306 | 307 | 308 | 309 | 310 | 311 | 312 | 313 | 314 | 315 |
|---|---|---|---|---|---|---|---|---|---|---|---|---|---|---|---|
| Flow (lb/h) | 15,867 | 17,717 | 17,717 | 16,834 | 883 | 10,917 | 5,917 | 110 | 773 | 9,659 | 1,258 | 6,027 | 7,809 | 1,850 | 13,836 |
| Flow (MMscfd) | 10.0 | 14.6 | 14.6 | 14.4 | 0.14 | 11.7 | 2.7 | 0.03 | 0.11 | 7.6 | 4.2 | 2.7 | 3.0 | 4.6 | 5.7 |
| Temperature (° C.) | 30 | 36 | 295 | 30 | 30 | 25 | 27 | 30 | 30 | 27 | 26 | 27 | 61 | 56 | 26 |

TABLE 1-continued

| Stream | 301 | 302 | 303 | 304 | 305 | 306 | 307 | 308 | 309 | 310 | 311 | 312 | 313 | 314 | 315 |
|---|---|---|---|---|---|---|---|---|---|---|---|---|---|---|---|
| Pressure (psia) | 50 | 50 | 1,000 | 1,000 | 1,000 | 1,000 | 50 | 150 | 150 | 1,000 | 400 | 50 | 1,000 | 200 | 50 |
| Component (mol %): | | | | | | | | | | | | | | | |
| Hydrogen | 60.0 | 70.2 | 70.2 | 70.8 | 5.2 | 75.6 | 49.6 | 22.0 | 0.2 | 63.8 | 97.0 | 49.2 | 20.0 | 92.4 | 33.9 |
| Methane | 16.0 | 12.8 | 12.8 | 12.9 | 4.4 | 13.0 | 12.3 | 16.1 | 1.0 | 18.9 | 2.3 | 12.4 | 39.1 | 5.7 | 26.4 |
| Ethane | 11.7 | 8.4 | 8.4 | 8.4 | 12.2 | 6.5 | 16.6 | 26.5 | 8.0 | 9.9 | 0.5 | 16.7 | 23.0 | 1.3 | 20.0 |
| Propane | 6.7 | 4.7 | 4.7 | 4.6 | 19.3 | 3.0 | 11.3 | 19.8 | 19.1 | 4.7 | 0.1 | 11.4 | 11.2 | 0.4 | 11.3 |
| n-Butane | 5.0 | 3.5 | 3.5 | 3.2 | 38.6 | 1.7 | 9.5 | 14.7 | 45.6 | 2.6 | 0.1 | 9.6 | 6.2 | 0.2 | 7.8 |
| n-Hexane | 0.6 | 0.4 | 0.4 | 0.2 | 20.4 | 0.1 | 0.7 | 0.9 | 26.1 | 0.2 | — | 0.7 | 0.4 | — | 0.5 |

— = less than 0.01
Membrane area = 582 (85 + 205 + 292) m$^2$
Theoretical horsepower = 3,086 hp As can be seen, the process of the invention yields 4.2 MMscfd of 97% pure hydrogen (stream 311) for use in the refinery, and recovers 773 lb/h of LPG as stream 309. The fuel gas stream (stream 315) has thus been reduced from 10 MMscfd to only 5.7 MMscfd. Hydrogen recovery is 68% and C$_{3+}$ recovery is 81%.

Example 2

A computer calculation was performed with a modeling program, ChemCad V, to illustrate the process of the invention in a simpler embodiment according to scheme A, for the recovery of hydrogen and LPG from a lean refinery off-gas stream. The membrane separation process was assumed to be carried out using the process design shown in FIG. 4. The feed stream to be treated was assumed to have the following composition:

| | |
|---|---|
| Hydrogen | 65.0% |
| Methane | 16.0% |
| Ethane | 10.0% |
| Propane | 4.0% |
| n-Butane | 3.0% |
| n-Pentane | 2.0% |

Figure 4:
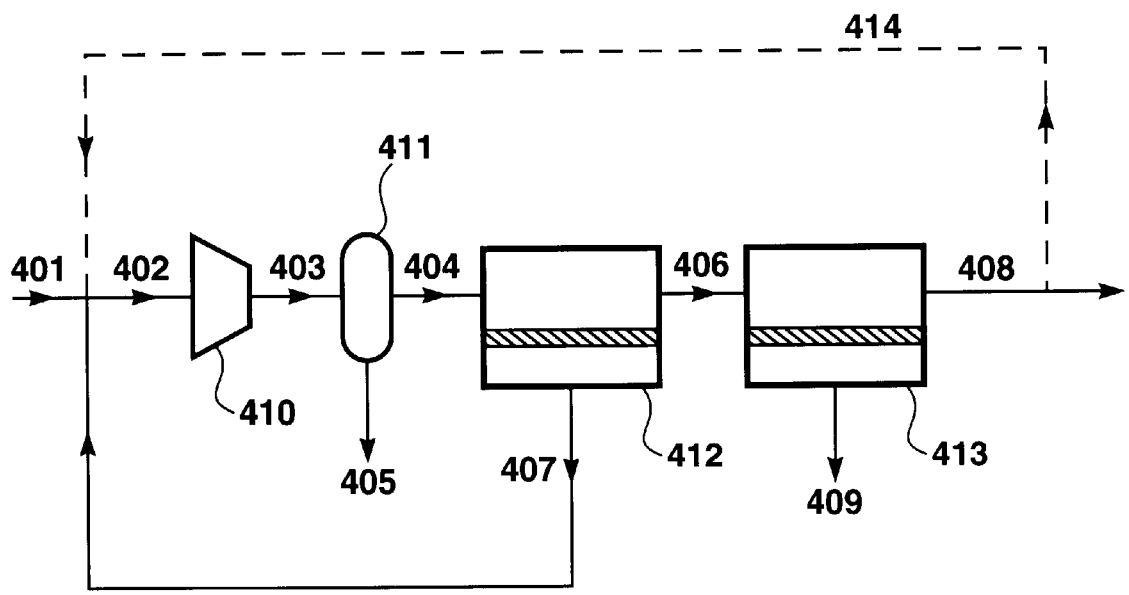
FIG. 4 is a schematic representation of a process according to scheme A and including a condensation/phase separation step for liquids recovery.

Turning now to FIG. 4, stream 401 is mixed with recycle stream 407 to form stream 402, which is compressed in compressor 410. Compressed stream 403 is cooled and passed to phase separator 411, from which condensed C$_{2+}$ hydrocarbons are withdrawn as LPG stream 405.

Uncondensed stream 404 is passed to membrane separation step 412, corresponding to step 104 of FIG. 1, which was assumed to contain rubbery hydrocarbon-selective membranes. Hydrocarbon-enriched permeate stream 407 is recycled to the front of the process for further hydrocarbon recovery and hydrogen purification. Hydrocarbon-depleted, hydrogen-enriched residue stream 406 is passed to second membrane separation step 413, which was assumed to contain the fluorinated hydrogen-selective membranes disclosed above. Hydrogen-enriched second permeate stream 409 is withdrawn, and may be used directly or after additional purification treatment. The second residue stream, 408, a hydrogen/mixed hydrocarbon stream, may be passed to the fuel header or elsewhere.

The feed gas was assumed to be at 50 psia and 25° C., and the feed flow was assumed to be 10 MMscfd. The results of the calculations are summarized in Table 2.

TABLE 2

| Stream | 401 | 402 | 403 | 404 | 405 | 406 | 407 | 408 | 409 |
|---|---|---|---|---|---|---|---|---|---|
| Flow (lb/h) | 13,734 | 27,954 | 27,954 | 23,809 | 4,145 | 9,592 | 14,217 | 7,205 | 2,388 |
| Flow (MMscfd) | 10.0 | 14.8 | 14.8 | 14.1 | 0.7 | 9.3 | 4.8 | 4.0 | 5.3 |
| Temperature (° C.) | 25 | 30 | 40 | 40 | 40 | 27 | 33 | 31 | 29 |
| Pressure (psia) | 50 | 50 | 800 | 800 | 800 | 800 | 50 | 800 | 400 |
| Component (mol %): | | | | | | | | | |
| Hydrogen | 65.0 | 54.2 | 54.2 | 56.7 | 4.0 | 69.6 | 31.9 | 42.3 | 90.0 |
| Methane | 16.0 | 16.2 | 16.2 | 16.8 | 4.8 | 16.9 | 16.6 | 29.5 | 7.5 |
| Ethane | 10.0 | 13.9 | 13.9 | 13.9 | 14.7 | 9.6 | 21.9 | 19.8 | 2.1 |
| Propane | 4.0 | 7.9 | 7.9 | 7.3 | 20.7 | 2.7 | 16.1 | 6.0 | 0.3 |
| n-Butane | 3.0 | 5.3 | 5.3 | 4.0 | 30.4 | 0.9 | 10.0 | 2.0 | 0.1 |
| n-Pentane | 2.0 | 2.5 | 2.5 | 1.3 | 25.4 | 0.2 | 3.4 | 0.5 | — |

— = less than 0.01
Membrane area = 860 (200 + 660) m$^2$
Theoretical horsepower = 2,637 hp As can be seen, this design yields 5.3 MMscfd of 90% pure hydrogen (stream 409) for use in the refinery, and recovers more than 4,000 lb/h of LPG as stream 405. The fuel gas stream (stream 408) has thus been reduced from 10 MMscfd to only 4.0 MMscfd. Hydrogen recovery is 73% and C$_{2+}$ recovery is 34%.

Example 3

A third calculation illustrating the process according to scheme A was performed, assuming the feed to be refinery off-gas stream richer in $C_{3+}$ hydrocarbons. The process was assumed to be carried out using the process design of FIG. 5. In this case, the first membrane separation step, corresponding to step 104 of FIG. 1, was assumed to be performed using two sub-steps, 514 and 515, both containing rubbery hydrocarbon-selective membranes. The calculation was performed to achieve the same 90% hydrogen product stream as in Example 2. The feed stream to be treated was assumed to have the following composition:

| | |
|---|---|
| Hydrogen | 40.0% |
| Methane | 20.0% |
| Ethane | 20.0% |
| Propane | 10.0% |
| n-Butane | 6.0% |
| n-Pentane | 4.0% |

Figure 5:
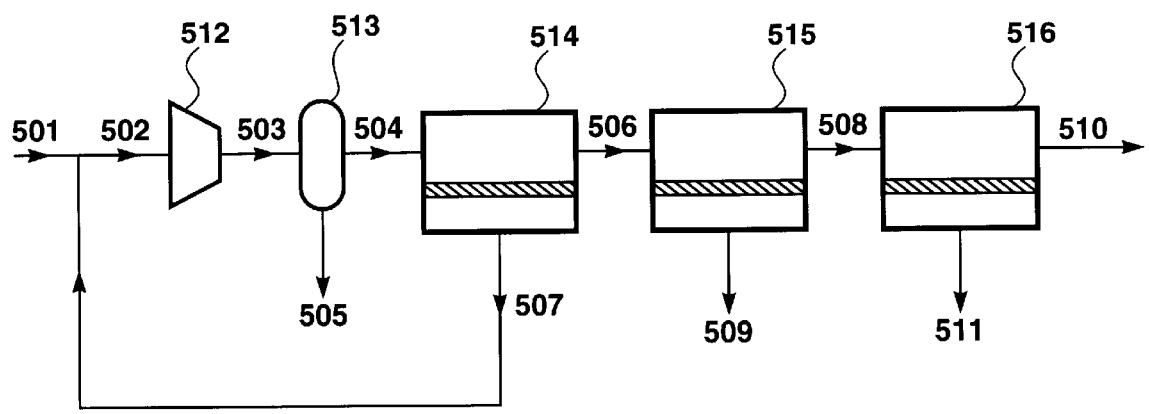
FIG. 5 is a schematic representation of a process according to scheme A using two hydrocarbon-selective membrane separation sub-steps followed by a second-gas-selective membrane separation step.

Turning now to FIG. 5, stream 501 is mixed with recycle stream 507 to form stream 502, which is compressed in compressor 512. Compressed stream 503 is cooled and passed to phase separator 513, from which condensed $C_{2+}$ hydrocarbons are withdrawn as LPG stream 505.

Uncondensed stream 504 is passed to membrane separation step 514, containing hydrocarbon-selective membranes. Hydrocarbon-enriched permeate stream 507 is recycled to the front of the process for further hydrocarbon recovery and hydrogen purification. Hydrocarbon-depleted, hydrogen-enriched residue stream 506 is passed to second hydrocarbon-selective membrane separation step 515, for additional removal of hydrocarbons as stream 509. This stream may be passed to the fuel gas line or elsewhere.

Hydrogen-enriched residue stream 508 is passed to third membrane step 516, which was assumed to contain the fluorinated hydrogen-selective membranes disclosed above. Hydrogen-enriched third permeate stream 511 is withdrawn, and may be used directly or after additional purification treatment. The third residue stream, 510, a hydrogen/mixed hydrocarbon stream, may be passed to the fuel header or elsewhere.

The feed gas was assumed to be at 50 psia and 25° C., and the feed flow was assumed to be 10 MMscfd. The results of the calculations are summarized in Table 3.

recovers nearly 15,000 lb/h of LPG as stream 505. The fuel gas stream (streams 509+510) is reduced from 10 MMscfd to less than 5.0 MMscfd. Hydrogen recovery is 47% and $C_{3+}$ recovery is 90%.

Example 4

Organic/Nitrogen Separation

A computer calculations were performed with a modeling program, ChemCad V, to illustrate the process of the invention according to scheme A for the removal of a volatile organic compound (VOC) from nitrogen. The stream to be treated was assumed to contain 2% hexane in 98% nitrogen, such as might arise from certain polyolefin manufacturing processes, for example. The goal of the process was assumed to be to reduce the organic content of the nitrogen stream to about 100 ppm.

In this example, the membrane separation process was assumed to be carried out using the process design shown in FIG. 4, using a rubbery hydrocarbon-selective membrane for the first step 412 and the fluorinated nitrogen-selective membranes disclosed above for membrane separation step 413. In this case, the second residue stream was assumed not to be withdrawn as stream 408, but to be recycled as stream 414 to the front of the process for further hexane recovery and nitrogen purification.

The feed gas was assumed to be at 20 psia and 25° C., and the feed flow was assumed to be 100 scfm. The results of the calculations are summarized in Table 4.

TABLE 3

| Stream | 501 | 502 | 503 | 504 | 505 | 506 | 507 | 508 | 509 | 510 | 511 |
|---|---|---|---|---|---|---|---|---|---|---|---|
| Flow (lb/h) | 24,153 | 39,592 | 39,592 | 24,647 | 14,945 | 9,205 | 15,439 | 2,460 | 6,745 | 1,588 | 872 |
| Flow (MMscfd) | 10.0 | 15.4 | 15.4 | 12.4 | 3.0 | 7.0 | 5.4 | 3.2 | 3.8 | 1.1 | 2.1 |
| Temperature (° C.) | 25 | 21 | 186 | 25 | 25 | 6 | 15 | −8 | −1 | −6 | −7 |
| Pressure (psia) | 50 | 50 | 800 | 800 | 800 | 800 | 50 | 800 | 50 | 800 | 400 |
| Component (mol %): | | | | | | | | | | | |
| Hydrogen | 40.0 | 33.7 | 33.7 | 41.1 | 3.3 | 55.8 | 22.0 | 73.3 | 41.0 | 41.6 | 90.0 |
| Methane | 20.0 | 20.8 | 20.8 | 23.9 | 7.7 | 25.3 | 22.1 | 20.8 | 29.1 | 43.5 | 8.8 |
| Ethane | 20.0 | 25.0 | 25.0 | 23.9 | 29.3 | 16.0 | 34.3 | 5.7 | 24.7 | 14.2 | 1.2 |
| Propane | 10.0 | 12.0 | 12.0 | 8.3 | 27.4 | 2.5 | 15.8 | 0.2 | 4.5 | 0.6 | — |
| n-Butane | 6.0 | 5.5 | 5.5 | 2.2 | 19.1 | 0.3 | 4.5 | — | 0.6 | 0.1 | — |
| n-Pentane | 4.0 | 3.0 | 3.0 | 0.6 | 13.2 | 0.1 | 1.2 | — | 0.1 | — | — |

— = less than 0.01
Membrane area = 617 (200 + 200 + 217) $m^2$
Theoretical horsepower = 2,537 hp As can be seen, this design yields 2.1 MMscfd of 90% pure hydrogen (stream 511) for use in the refinery, and

TABLE 4

| Stream | 401 | 402 | 403 | 404 | 405 | 406 | 407 | 414 | 409 |
|---|---|---|---|---|---|---|---|---|---|
| Flow (lb/h) | 488 | 1,122 | 1,122 | 1,094 | 29 | 615 | 479 | 156 | 459 |
| Flow (scfm) | 100 | 220 | 220 | 218 | 2 | 130 | 88 | 32 | 98 |
| Temperature (° C.) | 25 | 27 | 235 | 30 | 30 | 29 | 29 | 27 | 28 |
| Pressure (psia) | 20 | 20 | 120 | 120 | 120 | 120 | 20 | 120 | 15 |
| Component (mol %): | | | | | | | | | |
| Nitrogen | 98.0 | 4.2 | 4.2 | 3.4 | 1.2 | 0.5 | 7.5 | 98.0 | 100.0 |
| n-Hexane | 2.0 | 95.8 | 95.8 | 96.6 | 98.8 | 99.5 | 92.4 | 2.0 | 107 ppm |

— = less than 0.01
Membrane area = 266 (94 + 172) m$^2$
Theoretical horsepower = 35 hp As can be seen, the treated nitrogen product stream, containing 107 ppm hexane, meets the target specification. Membrane area and horsepower requirements to meet this target are modest.

Example 5

Organic/Air Separation

A computer calculation was performed with a modeling program, ChemCad V, to illustrate the process of the invention for the removal of hydrocarbons from air, such as recovery of hydrocarbon vapors from a gasoline tank overhead vent stream. The goal was assumed to be to reduce the hydrocarbon content of the vent stream below 2%.

The membrane separation process was again assumed to be carried out in accordance with scheme A, using the process design shown in FIG. 4, with a hydrocarbon-selective membrane separation step followed by an air-selective membrane separation step. The second residue stream was assumed not to be withdrawn as stream 408, but to be recycled as stream 414 to the front of the process for further hydrocarbon recovery. The feed gas was assumed to be at 20 psia and 25° C., and the feed flow was assumed to be 100 scfm. The results of the calculations are summarized in Table 5.

TABLE 5

| Stream | 401 | 402 | 403 | 404 | 405 | 406 | 407 | 414 | 409 |
|---|---|---|---|---|---|---|---|---|---|
| Flow (lb/h) | 778 | 1,386 | 1,386 | 839 | 548 | 432 | 407 | 201 | 231 |
| Flow (scfm) | 100 | 185 | 185 | 132 | 52 | 79 | 53 | 32 | 48 |
| Temperature (° C.) | 25 | 25 | 117 | 30 | 30 | 25 | 28 | 28 | 27 |
| Pressure (psia) | 20 | 20 | 120 | 120 | 120 | 120 | 20 | 120 | 15 |
| Component (mol %): | | | | | | | | | |
| Methane | 0.2 | 0.5 | 0.5 | 0.6 | 0.03 | 0.6 | 0.6 | 1.0 | 0.4 |
| C$_{2+}$ | 52.3 | 51.8 | 51.8 | 33.3 | 98.7 | 14.7 | 61.2 | 35.1 | 1.0 |
| Nitrogen | 38.0 | 39.0 | 39.0 | 54.0 | 0.8 | 71.8 | 27.4 | 61.1 | 78.8 |
| Oxygen | 9.6 | 8.7 | 8.7 | 12.0 | 0.4 | 12.9 | 10.8 | 2.7 | 19.7 |

— = less than 0.01
Membrane area = 121 (24 + 97) m$^2$
Theoretical horsepower = 34 hp As can be seen, the process of the invention yields an air vent stream (stream 409) containing only 1.4% hydrocarbon vapors and an LPG stream (stream 405) of 548 lb/h. The membrane area and horsepower requirements are modest.

Examples 6–10

Natural Gas Processing

Example 6

Figure 6:
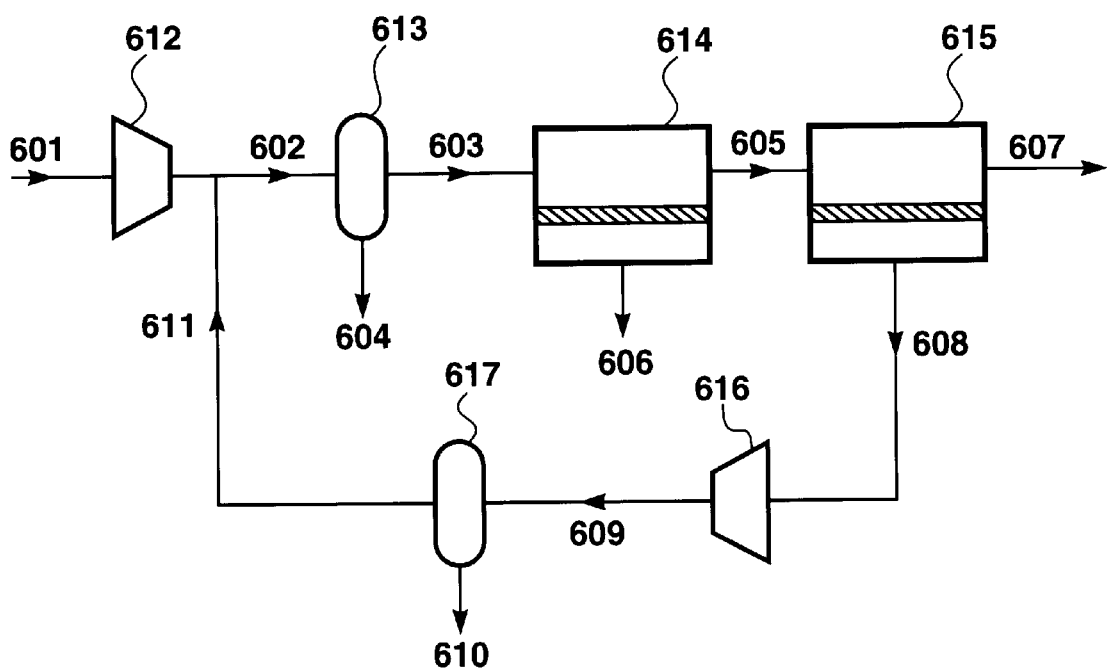
FIG. 6 is a schematic representation of a process according to scheme C and including condensation/phase separation steps for liquids recovery.

A computer calculation was performed with a modeling program, ChemCad V, to illustrate the process of the invention according to scheme C for the recovery of carbon dioxide, pipeline natural gas, and NGL from associated gas produced by oilfield flood operations. The membrane separation process was assumed to be carried out using the process design shown in FIG. 6.

In this figure, stream 601 is compressed in compressor 612 and is mixed with recycle stream 611 to form combined stream 602. Stream 602 is cooled and passed to phase separator 613, where condensed water is removed as stream 604.

Uncondensed stream 603 is passed to first membrane separation step 614, which was assumed to contain the fluorinated carbon-dioxide-selective membranes disclosed above. The hydrocarbon-depleted, carbon dioxide-enriched permeate stream, 606, is withdrawn, and may be used for reinjection.

Hydrocarbon-enriched residue stream 605 is passed to second membrane separation step 615, assumed to contain the rubbery, hydrocarbon-selective membranes disclosed above.

The methane-enriched residue stream, 607, is withdrawn and passed to the pipeline, either directly, or after additional treatment. The second permeate stream, 608, enriched in C$_{2+}$ hydrocarbons, is recompressed in compressor 616, cooled and passed to phase separator 617. Liquefied NGL product stream 610 is withdrawn, and the separator overhead gas, stream 611, is recirculated to the front of the process and mixed with the compressed feed stream to form stream 602.

The feed gas was assumed to be at 50 psia and 30° C., and the feed flow was assumed to be 10 MMscfd. The results of the calculations are summarized in Table 6.

TABLE 6

| Stream | 601 | 602 | 603 | 604 | 605 | 606 | 607 | 608 | 609 | 610 | 611 |
|---|---|---|---|---|---|---|---|---|---|---|---|
| Flow (lb/h) | 44,035 | 52,051 | 51,972 | 79 | 16,585 | 35,388 | 6,884 | 9,701 | 9,701 | 1,685 | 8,016 |
| Flow (MMscfd) | 10.0 | 12.0 | 12.0 | 0.04 | 4.9 | 7.1 | 2.6 | 2.3 | 2.3 | 0.3 | 2.0 |
| Temperature (° C.) | 30 | 166 | 30 | 30 | 46 | 53 | 32 | 39 | 171 | 25 | 25 |
| Pressure (psia) | 50 | 500 | 500 | 500 | 500 | 50 | 500 | 50 | 500 | 500 | 500 |
| Component (mol %): | | | | | | | | | | | |
| Carbon Dioxide | 70.0 | 64.8 | 65.0 | 1.4 | 20.0 | 96.0 | 5.0 | 36.6 | 36.6 | 20.7 | 39.1 |
| Water | 0.5 | 0.4 | 0.1 | 98.2 | — | 0.2 | — | — | — | — | — |
| Methane | 20.0 | 21.2 | 21.3 | 0.1 | 47.5 | 3.3 | 68.1 | 24.6 | 24.6 | 6.2 | 27.4 |
| Ethane | 5.0 | 7.1 | 7.1 | — | 17.0 | 0.4 | 16.6 | 17.3 | 17.3 | 15.0 | 17.7 |
| Propane | 3.0 | 4.6 | 4.6 | 0.1 | 11.2 | 0.1 | 7.9 | 14.9 | 14.9 | 29.3 | 12.7 |
| n-Butane | 1.0 | 1.3 | 1.3 | — | 3.2 | — | 1.8 | 4.7 | 4.7 | 17.0 | 2.9 |
| n-Hexane | 0.5 | 0.5 | 0.5 | 0.1 | 1.1 | — | 0.5 | 1.8 | 1.8 | 11.8 | 0.3 |

— = less than 0.01
Membrane area = 1,545 (1,480 + 65) $m^2$
Theoretical horsepower = 1,743 (1,427 + 316) hp The 10.0 MMscfd of raw associated gas entering the system yields three product streams: 7.1 MMscfd of carbon dioxide suitable for reinjection; 2.6 MMscfd of natural gas; and nearly 1,700 lb/h of NGL.

Example 7

A computer calculation was performed with a modeling program, ChemCad V, to illustrate the process of the invention according to scheme C for the removal of contaminants, particularly carbon dioxide, nitrogen, and hydrogen sulfide, from a natural gas stream. The membrane separation process was assumed to be carried out using the process design shown in FIG. 7.

In this case, both membrane separation steps of scheme C were assumed to be carried out in two sub-steps. Thus, steps 715 and 717 correspond to step 104 of FIG. 1, and steps 718 and 719 correspond to step 107 of FIG. 1. Step 104 also includes a second stage 716 for additional treatment of the permeate from sub-step 715.

Figure 7:
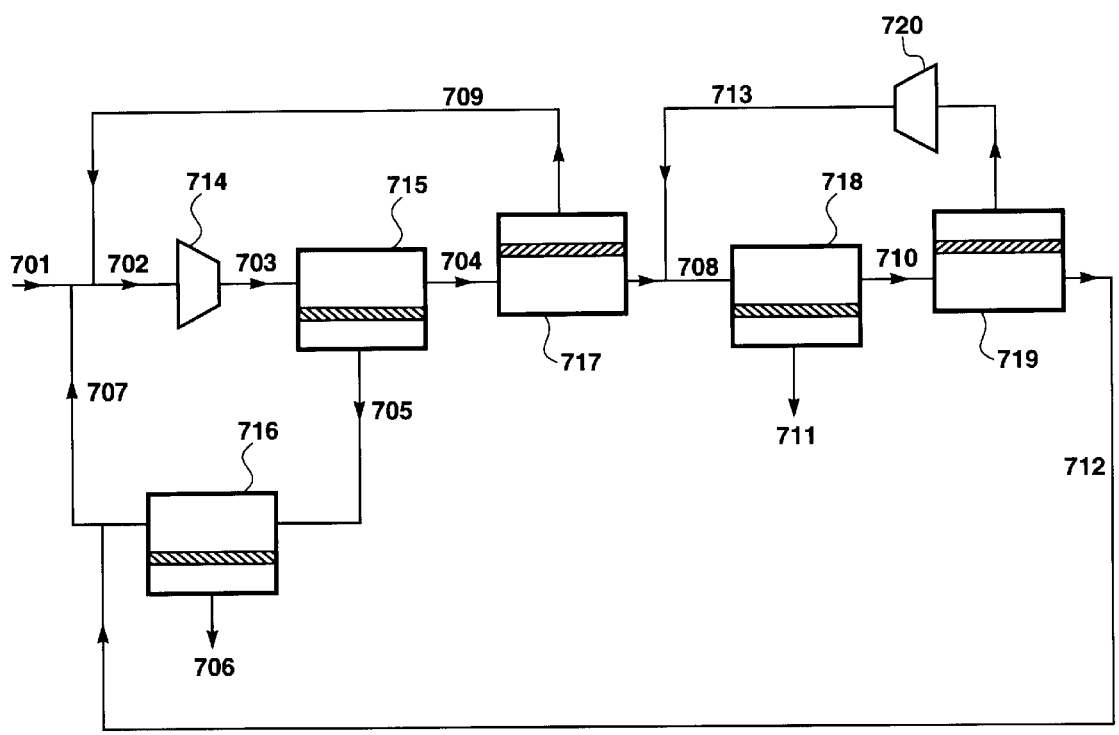
FIG. 7 is a schematic representation of a process according to scheme C. In this case, the first membrane separation step is divided into two sub-steps and a second stage; the second membrane separation step is divided into two sub-steps.

In FIG. 7, stream 701 is combined with recycle streams 707 and 709, to form stream 702, which is compressed in compressor 714. Compressed stream 703 is passed to first membrane separation step 715, which was assumed to contain the fluorinated membranes selective for nitrogen, carbon dioxide and hydrogen sulfide over methane disclosed above.

The contaminant-enriched permeate stream, 705, from this step still contains too much methane to be discharged from the process, so is passed to a second membrane separation stage, 716, containing the same type of membranes as in unit 715. Methane-depleted, nitrogen-rich waste stream, 706, is withdrawn and may be passed to the fuel header or some other destination. The methane-enriched residue from this stage is recycled as stream 707 to the front of the process for additional methane recovery.

The methane-enriched first residue stream, 704, is passed to second membrane separation step 717, which contains the same type of membranes as in unit 715. Contaminant-enriched permeate stream 709 is recycled to the front of the process for additional contaminant removal. The methane-enriched residue is combined with recycle stream 713 to form stream 708. Stream 708 is passed to membrane separation step 718, containing rubbery, methane-selective membranes. Here, methane permeates preferentially and natural gas product stream 711 is withdrawn.

Third residue stream 710 is passed to a fourth membrane step, 719, containing the same type of membranes as in unit 718. Here, stream 710 is split into a methane-rich permeate, 713, which is recompressed in compressor 720 and returned to the front of the methane-recovery section, and a nitrogen-rich residue stream 712, which is recirculated to the front of the process.

The feed gas was assumed to be at 200 psia and 25° C., and the feed flow was assumed to be 10 MMscfd. The results of the calculations are summarized in Table 7.

As can be seen, the multistep and multistage process yields 6.6 MMscfd of pipeline quality natural gas. Methane recovery is good at 84%.

TABLE 7

| Stream | 701 | 702 | 703 | 704 | 705 | 706 | 707 |
|---|---|---|---|---|---|---|---|
| Flow (lb/h) | 23,917 | 69,463 | 69,463 | 45,602 | 23,866 | 11,298 | 21,007 |
| Flow (MMscfd) | 10.0 | 30.2 | 30.2 | 21.3 | 9.0 | 3.4 | 9.5 |
| Temperature (° C.) | 25 | 6 | 25 | 17 | 21 | 20 | −19 |
| Pressure (psia) | 200 | 200 | 1,200 | 1,200 | 200 | 20 | 200 |
| Component (mol %): | | | | | | | |
| Methane | 75.0 | 74.4 | 74.4 | 81.4 | 57.8 | 35.1 | 75.3 |
| Carbon Dioxide | 9.9 | 4.4 | 4.4 | 1.3 | 11.8 | 28.5 | 0.8 |

TABLE 7-continued

|  |  |  |  |  |  |  |  |
|---|---|---|---|---|---|---|---|
| Nitrogen | 15.0 | 21.1 | 21.1 | 17.3 | 30.2 | 36.0 | 23.9 |
| Water | 0.1 | 432 ppm | 432 ppm | 118 ppm | 0.1 | 0.3 | 64 ppm |
| Hydrogen Sulfide | 100 ppm | 45 ppm | 45 ppm | 13 ppm | 120 ppm | 228 ppm | 9 ppm |

| Stream | 708 | 709 | 710 | 711 | 712 | 713 |
|---|---|---|---|---|---|---|
| Flow (lb/h) | 32,845 | 24,539 | 20,222 | 12,623 | 8,439 | 11,782 |
| Flow (MMscfd) | 16.6 | 10.8 | 10.0 | 6.6 | 3.9 | 6.0 |
| Temperature (° C.) | 11 | 10 | −3 | 4 | −28 | 25 |
| Pressure (psia) | 1,200 | 200 | 1,200 | 200 | 1,200 | 1,200 |
| Component (mol %): |  |  |  |  |  |  |
| Methane | 91.3 | 73.1 | 88.3 | 95.9 | 80.0 | 93.7 |
| Carbon Dioxide | 0.1 | 2.5 | 0.1 | 0.1 | 0.1 | 0.1 |
| Nitrogen | 8.6 | 24.4 | 11.7 | 4.0 | 20.0 | 6.2 |
| Water | 5 ppm | 226 ppm | 1 ppm | 12 ppm | 0.0 | 2 ppm |
| Hydrogen Sulfide | 1 ppm | 25 ppm | 0.0 | 1 ppm | 0.0 | 1 ppm |

— = less than 0.01
Membrane area = 3,234 [(500 + 706) + (771) + (642 + 615)] m$^2$
Theoretical horsepower = 3,591 (3,039 + 552) hp

Examples 8–9

Figure 8:
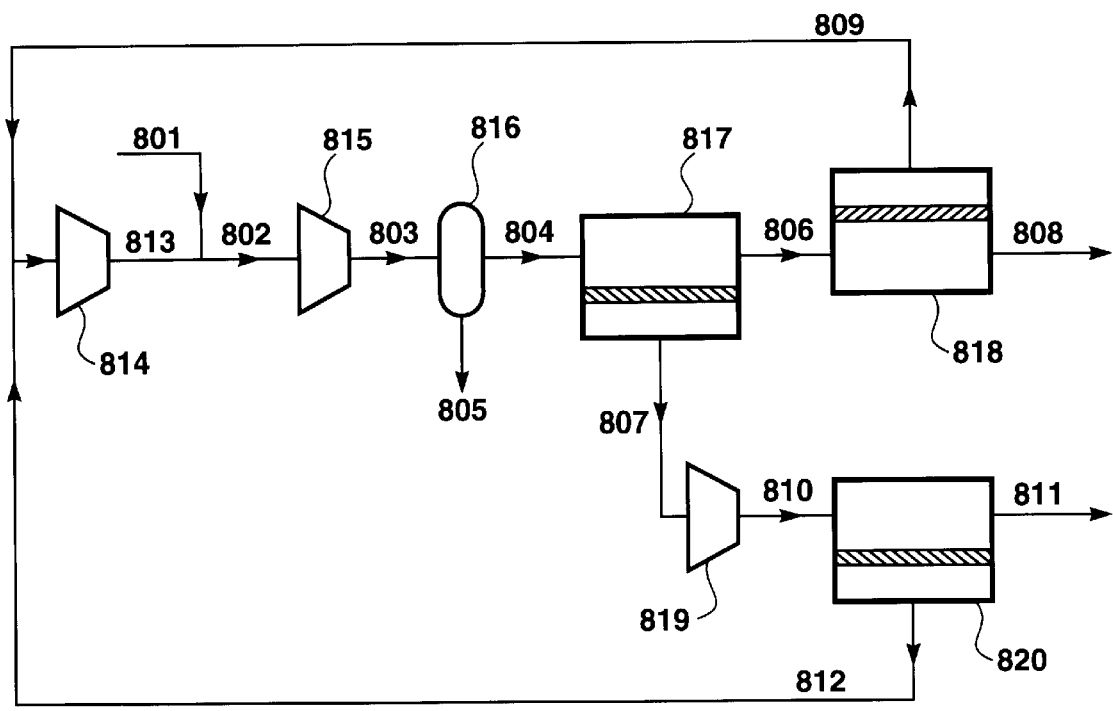
FIG. 8 is a schematic representation of a process according to scheme B using a hydrocarbon-selective membrane separation step divided into two sub-steps, followed by a second-gas-selective membrane separation step as a second stage to treat the permeate from the first sub-step.

Two computer calculations were performed with a modeling program, ChemCad V, to illustrate the process of the invention according to scheme B for the removal of nitrogen from natural gas, using the process design shown in FIG. 8. In this case, the first membrane separation step of scheme B, step 204 of FIG. 2, was assumed to be split into two sub-steps, 817 and 818, both containing rubbery hydrocarbon-selective membranes as disclosed above. The goal of the process was to produce pipeline-grade natural gas from a raw gas stream containing 18% nitrogen.

Example 8

Not in Accordance with the Invention

For the first calculation, it was assumed that the process used only a two-step configuration, with rubbery, methane-selective membranes in both steps. Thus referring to FIG. 8, nitrogen-contaminated natural gas stream 801 is mixed with recycle stream 813 to form stream 802. Stream 802 is compressed in compressor 815 to form compressed stream 803. Stream 803 is cooled and passed to phase separator 816, from which condensed water is removed as stream 805. Uncondensed stream 804 is passed to first membrane separation step 817, where it is separated into methane-rich permeate stream 807 and nitrogen-enriched residue stream 806.

For this calculation, step 820 was not used; the methane product was assumed to be stream 807. As can be seen from Table 8, this does not quite meet pipeline specification of 4% nitrogen.

Residue stream 806 is passed to second membrane separation step 818. Nitrogen-rich waste stream 808 is withdrawn from this step and may be passed to the fuel header or elsewhere. Nitrogen-depleted permeate stream 809 is too rich in methane to be used as fuel gas, so it is mixed with recycle stream 812, compressed in compressor 814, and recirculated to the separation steps. In this manner, the process produces two product streams, a treated natural gas stream and a waste stream containing less than 50% methane.

The feed gas was assumed to be at 600 psia and 26° C., and the feed flow was assumed to be 10 MMscfd. The results of the calculations are summarized in Table 8.

TABLE 8

| Stream | 801 | 802 | 803 | 804 | 805 | 806 | 807 | 808 | 809 |
|---|---|---|---|---|---|---|---|---|---|
| Flow (MMscfd) | 10.0 | 40.1 | 40.1 | 40.1 | 0.05 | 32.8 | 7.2 | 2.7 | 30.1 |
| Temperature (° C.) | 26 | 97 | 5 | 5 | 5 | −1 | 2 | −37 | −19 |
| Pressure (psia) | 600 | 600 | 1,200 | 1,200 | 1,200 | 1,200 | 200 | 1,200 | 200 |
| Component (mol %): |  |  |  |  |  |  |  |  |  |
| Nitrogen | 18.0 | 11.8 | 11.8 | 11.9 | 0.0 | 13.4 | 4.6 | 53.8 | 9.8 |
| Methane | 77.0 | 85.1 | 85.1 | 85.2 | 0.0 | 84.4 | 89.1 | 46.2 | 87.8 |
| Ethane | 3.0 | 2.1 | 2.1 | 2.1 | 0.0 | 1.6 | 4.1 | — | 1.8 |
| Propane | 1.0 | 0.6 | 0.6 | 0.6 | 0.0 | 0.4 | 1.4 | — | 0.4 |
| n-Butane | 0.5 | 0.3 | 0.3 | 0.3 | 0.0 | 0.2 | 0.7 | — | 0.1 |
| Water | 0.5 | 0.1 | 0.1 | — | 100.0 | — | 0.1 | 0.0 | — |

— = less than 0.01
Membrane area = 2,321 (406 + 1,915) m$^2$
Theoretical horsepower = 3,525 (1,793 + 1,732) hp As can be seen, the process yields 7.2 MMscfd of natural gas as product stream 807, containing 4.6% nitrogen. Methane recovery is good, at 83%.

Example 9

The calculation of Example 8 was repeated, except this time using membrane stage 820. Thus, first permeate stream 807, depleted in nitrogen and enriched in methane, is recompressed in compressor 819, and passed as compressed stream 810 to second membrane stage 820. This stage was assumed to contain the fluorinated nitrogen-selective membranes disclosed above, and separates stream 807 into methane-enriched residue stream 811, which is withdrawn as the primary product, and nitrogen-enriched permeate stream 812, which is recycled to the front of the process to be mixed with stream 809.

All other process parameters were assumed to be as in Example 8. The results are shown in Table 9.

903. Stream 903 is passed to first membrane separation step 912, containing nitrogen-selective membranes. Methane-enriched residue stream, 904, is passed to a second membrane step, unit 913, containing the same type of membranes as in unit 912. Pipeline quality natural gas is withdrawn as stream 906. Permeate stream 907 contains too much methane to be used as fuel gas, so this stream is recycled to the front of the process for further methane recovery.

First contaminant-enriched permeate stream 905 is recompressed in compressor 914 and compressed stream

TABLE 9

| Stream | 801 | 802 | 803 | 804 | 805 | 806 | 807 | 808 | 809 | 810 | 811 | 812 | 813 |
|---|---|---|---|---|---|---|---|---|---|---|---|---|---|
| Flow (MMscfd) | 10.0 | 41.4 | 41.4 | 41.4 | 0.005 | 34.1 | 7.3 | 3.2 | 30.8 | 7.3 | 6.7 | 0.6 | 31.4 |
| Temperature (° C.) | 26 | 98 | 6 | 6 | 6 | 0 | 3 | −36 | −18 | 25 | 24 | 24 | 122 |
| Pressure (psia) | 600 | 600 | 1200 | 1,200 | 1,200 | 1,200 | 200 | 1,200 | 200 | 600 | 600 | 200 | 600 |
| Component (mol %): | | | | | | | | | | | | | |
| Nitrogen | 18.0 | 10.9 | 10.9 | 10.9 | 0.0 | 12.3 | 4.2 | 47.2 | 8.6 | 4.2 | 4.0 | 6.9 | 8.6 |
| Methane | 77.0 | 86.0 | 86.0 | 86.1 | 0.0 | 85.4 | 89.3 | 52.8 | 88.8 | 89.3 | 89.3 | 89.7 | 88.9 |
| Ethane | 3.0 | 2.2 | 2.2 | 2.2 | 0.0 | 1.7 | 4.3 | 0.1 | 1.9 | 4.3 | 4.4 | 2.6 | 1.9 |
| Propane | 1.0 | 0.6 | 0.6 | 0.6 | 0.0 | 0.4 | 1.4 | — | 0.4 | 1.4 | 1.5 | 0.5 | 0.4 |
| n-Butane | 0.5 | 0.3 | 0.3 | 0.3 | 0.0 | 0.2 | 0.7 | — | 0.2 | 0.7 | 0.7 | 0.1 | 0.2 |
| Water | 0.5 | 0.1 | 0.1 | — | 100.0 | — | 0.1 | — | 0.1 | — | 0.1 | 0.1 | — |

— = less than 0.01
Membrane area = 2,441 (406 + 1,915 + 120) m²
Theoretical horsepower = 4,056 (1,853 + 1,806 + 397) hp As can be seen, addition of the nitrogen-selective membrane separation step as a second stage to polish the natural gas product enables the process to meet pipeline specification of 4% nitrogen.

Example 10

A computer calculation was performed with a modeling program, ChemCad V, to illustrate the process of the invention according to scheme D for treating a raw natural gas stream heavily contaminated with nitrogen, and also containing carbon dioxide.

Figure 9:
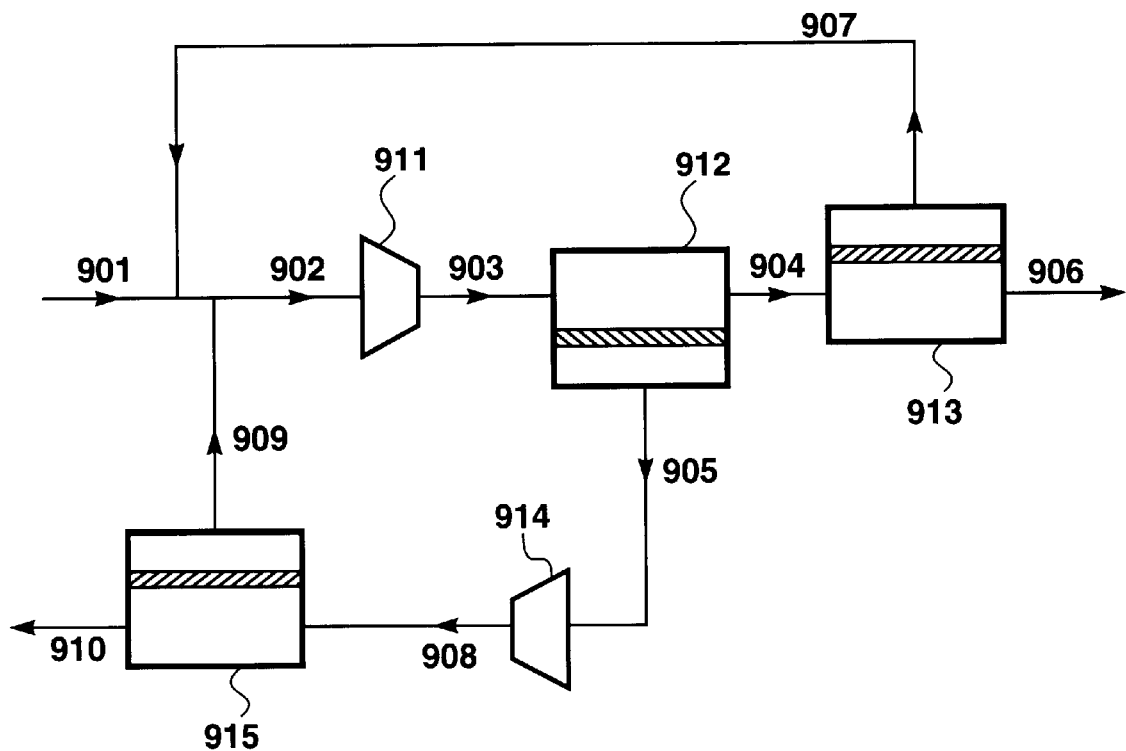
FIG. 9 is a schematic representation of a process according to scheme D using a second-gas-selective membrane separation step divided into two sub-steps, followed by a hydrocarbon-selective membrane separation step as a second stage to treat the permeate from the first sub-step.

The separation was assumed to be carried out using the process design of FIG. 9. In this case, the first membrane 908 is passed to second-stage membrane separation unit 915, containing rubbery, hydrocarbon-selective membranes as disclosed above. Nitrogen-rich waste gas residue stream 910 is withdrawn from the process. Methane-enriched permeate stream 909 is recirculated to the front of the process.

The feed gas was assumed to be at 200 psia and 25° C., and the feed flow was assumed to be 10 MMscfd. The results of the calculations are summarized in Table 10.

TABLE 10

| Stream | 901 | 902 | 903 | 904 | 905 | 906 | 907 | 908 | 909 | 910 |
|---|---|---|---|---|---|---|---|---|---|---|
| Flow (lb/h) | 22,277 | 228,178 | 228,042 | 38,804 | 189,238 | 12,929 | 25,875 | 189,238 | 180,026 | 9,212 |
| Flow (MMscfd) | 10.0 | 67.8 | 67.8 | 19.0 | 48.8 | 6.7 | 12.2 | 48.8 | 45.6 | 3.2 |
| Temperature (° C.) | 25 | −4 | 25 | −11 | 7 | −36 | −24 | 25 | −4 | −33 |
| Pressure (psia) | 200 | 200 | 1,200 | 1,200 | 200 | 1,200 | 200 | 1,200 | 200 | 1,200 |
| Component (mol %): | | | | | | | | | | |
| Methane | 75.0 | 47.2 | 47.2 | 88.6 | 31.2 | 96.0 | 84.6 | 31.2 | 31.1 | 31.9 |
| Carbon Dioxide | 1.0 | 41.4 | 41.4 | 1.3 | 56.9 | 254 ppm | 2.1 | 56.9 | 60.8 | 2.2 |
| Nitrogen | 24.0 | 11.4 | 11.4 | 10.0 | 11.9 | 4.0 | 13.3 | 11.9 | 8.1 | 65.9 |

— = less than 0.01
Membrane area = 5,539 (1,500 + 873 + 3,166) m²
Theoretical horsepower = 11,070 (6,347 + 4,723) hp separation step of scheme D, step 204 of FIG. 2, was assumed to be split into two sub-steps, 912 and 913, both containing the fluorinated nitrogen-selective membranes as disclosed above. The goal of the process was to produce pipeline-grade natural gas.

Referring to FIG. 9, in this case, nitrogen- and carbon dioxide-contaminated natural gas stream 901 is mixed with recycle streams 907 and 909 to form stream 902. Stream 902 is compressed in compressor 911 to form compressed stream As can be seen, the process yields 6.7 MMscfd of natural gas, stream 906, that meets pipeline specification for the contaminants nitrogen and carbon dioxide. Only 3.2 MMscfd of gas is passed to the fuel header.

We claim:

1. A process for treating a gas mixture comprising a gaseous hydrocarbon and a second gas, the process comprising:

(a) providing a first membrane unit containing a first membrane having a first feed side and a first permeate side, the first membrane being selective in favor of the gaseous hydrocarbon over the second gas;

(b) providing a second membrane unit containing a second membrane having a second feed side and a second permeate side, the second membrane being selective in favor of the second gas over the gaseous hydrocarbon, and including a selective layer comprising a polymer comprising repeating units having a fluorinated cyclic structure of an at least 5-member ring, the polymer having a fractional free volume no greater than about 0.3;

the second membrane unit being connected in series with the first membrane unit such that gas leaving the first feed side can enter the second membrane unit on the second feed side;

(c) passing the gas mixture into the first membrane unit and across the first feed side;

(d) providing a first driving force for transmembrane permeation;

(e) withdrawing from the first feed side a first residue stream depleted in the gaseous hydrocarbon compared with the gas mixture;

(f) withdrawing from the first permeate side a first permeate stream enriched in the gaseous hydrocarbon compared with the gas mixture;

(g) passing the first residue stream into the second membrane unit and across the second feed side;

(h) providing a second driving force for transmembrane permeation;

(i) withdrawing from the second feed side a second residue stream depleted in the second gas compared with the first residue stream;

(j) withdrawing from the second permeate side a second permeate stream enriched in the second gas compared with the first residue stream.

2. The process of claim 1, wherein the second gas is selected from the group consisting of hydrogen, nitrogen, oxygen, methane and carbon dioxide.

3. The process of claim 1, wherein the gaseous hydrocarbon is selected from the group consisting of methane, ethylene, ethane and $C_{3+}$ hydrocarbons.

4. The process of claim 1, wherein the polymer is formed from a monomer selected from the group consisting of fluorinated dioxoles, fluorinated dioxolanes, fluorinated cyclically polymerizable alkyl ethers and perfluorinated polyimides.

5. The process of claim 1, wherein the gas mixture is selected from the group consisting of a natural gas stream, an associated gas stream, a refinery gas stream, a petrochemical plant gas stream, and an air stream.

6. The process of claim 1, wherein the second gas is nitrogen and the gaseous hydrocarbon is a $C_{2+}$ hydrocarbon.

7. The process of claim 1, wherein the second gas is nitrogen and the gaseous hydrocarbon is a $C_{3+}$ hydrocarbon.

8. The process of claim 1, wherein the second gas is air and the gaseous hydrocarbon is a volatile organic compound.

9. The process of claim 1, wherein the second gas is hydrogen and the gaseous hydrocarbon is a $C_{3+}$ hydrocarbon.

10. The process of claim 1, wherein the second gas is hydrogen and the gaseous hydrocarbon is methane.

11. A process for treating a gas mixture comprising a gaseous hydrocarbon and a second gas, the process comprising:

(a) providing a first membrane unit containing a first membrane having a first feed side and a first permeate side, the first membrane being selective in favor of the gaseous hydrocarbon over the second gas;

(b) providing a second membrane unit containing a second membrane having a second feed side and a second permeate side, the second membrane being selective in favor of the second gas over the gaseous hydrocarbon, and including a selective layer comprising a polymer having:

(i) a ratio of fluorine to carbon atoms in the polymer greater than 1:1;

(ii) a fractional free volume no greater than about 0.3; and (iii) a glass transition temperature of at least about 100° C.;

and the second membrane being characterized by a post-exposure selectivity for the second gas over the gaseous hydrocarbon, after exposure of the separation membrane to liquid toluene and subsequent drying, that is at least about 65% of a pre-exposure selectivity for the second gas over the gaseous hydrocarbon, as measured pre- and post-exposure with a test gas mixture of the same composition and under like conditions;

the second membrane unit being connected in series with the first membrane unit such that gas leaving the first feed side can enter the second membrane unit on the second feed side;

(c) passing the gas mixture into the first membrane unit and across the first feed side;

(d) providing a first driving force for transmembrane permeation;

(e) withdrawing from the first feed side a first residue stream depleted in the gaseous hydrocarbon compared with the gas mixture;

(f) withdrawing from the first permeate side a first permeate stream enriched in the gaseous hydrocarbon compared with the gas mixture;

(g) passing the first residue stream into the second membrane unit and across the second feed side;

(h) providing a second driving force for transmembrane permeation;

(i) withdrawing from the second feed side a second residue stream depleted in the second gas compared with the first residue stream;

(j) withdrawing from the second permeate side a second permeate stream enriched in the second gas compared with the first residue stream.

12. The process of claim 11, wherein the second gas is selected from the group consisting of hydrogen, nitrogen, oxygen, methane and carbon dioxide.

13. The process of claim 11, wherein the gaseous hydrocarbon is selected from the group consisting of methane, ethylene, ethane and $C_{3+}$ hydrocarbons.

14. The process of claim 11, wherein the polymer is formed from a monomer selected from the group consisting of fluorinated dioxoles, fluorinated dioxolanes, fluorinated cyclically polymerizable alkyl ethers and perfluorinated polyimides.

15. The process of claim 11, wherein the gas mixture is selected from the group consisting of a natural gas stream, an associated gas stream, a refinery gas stream, a petrochemical plant gas stream, and an air stream.

16. The process of claim 11, wherein the second gas is nitrogen and the gaseous hydrocarbon is a $C_{2+}$ hydrocarbon.

17. The process of claim 11, wherein the second gas is nitrogen and the gaseous hydrocarbon is a $C_{3+}$ hydrocarbon.

18. The process of claim 11, wherein the second gas is air and the gaseous hydrocarbon is a volatile organic compound.

19. The process of claim 11, wherein the second gas is hydrogen and the gaseous hydrocarbon is a $C_{3+}$ hydrocarbon.

20. The process of claim 11, wherein the second gas is hydrogen and the gaseous hydrocarbon is methane.

21. A process for treating a gas mixture comprising a gaseous hydrocarbon and a second gas, the process comprising:
    (a) providing a first membrane unit containing a first membrane having a first feed side and a first permeate side, the first membrane being selective in favor of the second gas over the gaseous hydrocarbon, and including a selective layer comprising a polymer comprising repeating units having a fluorinated cyclic structure of an at least 5-member ring, the polymer having a fractional free volume no greater than about 0.3;
    (b) providing a second membrane unit containing a second membrane having a second feed side and a second permeate side, the second membrane being selective in favor of the gaseous hydrocarbon over the second gas; the second membrane unit being connected in series with the first membrane unit such that gas leaving the first feed side can enter the second membrane unit on the second feed side;
    (c) passing the gas mixture into the first membrane unit and across the first feed side;
    (d) providing a first driving force for transmembrane permeation;
    (e) withdrawing from the first feed side a first residue stream depleted in the second gas compared with the gas mixture;
    (f) withdrawing from the first permeate side a first permeate stream enriched in the second gas compared with the gas mixture;
    (g) passing the first residue stream into the second membrane unit and across the second feed side;
    (h) providing a second driving force for transmembrane permeation;
    (i) withdrawing from the second feed side a second residue stream depleted in the gaseous hydrocarbon compared with the first residue stream;
    (j) withdrawing from the second permeate side a second permeate stream enriched in the gaseous hydrocarbon compared with the first residue stream.

22. The process of claim 21 wherein the second gas is selected from the group consisting of hydrogen, nitrogen, oxygen, methane and carbon dioxide.

23. The process of claim 21, wherein the gaseous hydrocarbon is selected from the group consisting of methane, ethylene, ethane and $C_{3+}$ hydrocarbons.

24. The process of claim 21, wherein the polymer is formed from a monomer selected from the group consisting of fluorinated dioxoles, fluorinated dioxolanes, fluorinated cyclically polymerizable alkyl ethers and perfluorinated polyimides.

25. The process of claim 21, wherein the gas mixture is selected from the group consisting of a natural gas stream, an associated gas stream, a refinery gas stream, a petrochemical plant gas stream, and an air stream.

26. The process of claim 21, wherein the second gas is carbon dioxide and the gaseous hydrocarbon is methane.

27. The process of claim 21, wherein the second gas is carbon dioxide and the gaseous hydrocarbon is a $C_{3+}$ hydrocarbon.

28. The process of claim 21, wherein the second gas is nitrogen and the gaseous hydrocarbon is a butane.

29. The process of claim 21, wherein the second gas is air and the gaseous hydrocarbon is a volatile organic compound.

30. A process for treating a gas mixture comprising a gaseous hydrocarbon and a second gas, the process comprising:
    (a) providing a first membrane unit containing a first membrane having a first feed side and a first permeate side, the first membrane being selective in favor of the second gas over the gaseous hydrocarbon, and including a selective layer comprising a polymer having:
        (i) a ratio of fluorine to carbon atoms in the polymer greater than 1:1;
        (ii) a fractional free volume no greater than about 0.3; and
        (iii) a glass transition temperature of at least about 100° C.;
        and the first membrane being characterized by a post-exposure selectivity for the second gas over the gaseous hydrocarbon, after exposure of the separation membrane to liquid toluene and subsequent drying, that is at least about 65% of a pre-exposure selectivity for the second gas over the gaseous hydrocarbon, as measured pre- and post-exposure with a test gas mixture of the same composition and under like conditions;
    (b) providing a second membrane unit containing a second membrane having a second feed side and a second permeate side, the second membrane being selective in favor of the gaseous hydrocarbon over the second gas; the second membrane unit being connected in series with the first membrane unit such that gas leaving the first feed side can enter the second membrane unit on the second feed side;
    (c) passing the gas mixture into the first membrane unit and across the first feed side;
    (d) providing a first driving force for transmembrane permeation;
    (e) withdrawing from the first feed side a first residue stream depleted in the second gas compared with the gas mixture;
    (f) withdrawing from the first permeate side a first permeate stream enriched in the second gas compared with the gas mixture;
    (g) passing the first residue stream into the second membrane unit and across the second feed side;
    (h) providing a second driving force for transmembrane permeation;
    (i) withdrawing from the second feed side a second residue stream depleted in the gaseous hydrocarbon compared with the first residue stream;
    (j) withdrawing from the second permeate side a second permeate stream enriched in the gaseous hydrocarbon compared with the first residue stream.

31. The process of claim 30, wherein the second gas is selected from the group consisting of hydrogen, nitrogen, oxygen, methane and carbon dioxide.

32. The process of claim 30, wherein the gaseous hydrocarbon is selected from the group consisting of methane, ethylene, ethane and $C_{3+}$ hydrocarbons.

33. The process of claim 30, wherein the polymer is formed from a monomer selected from the group consisting of fluorinated dioxoles, fluorinated dioxolanes, fluorinated cyclically polymerizable alkyl ethers and perfluorinated polyimides.

34. The process of claim 30, wherein the gas mixture is selected from the group consisting of a natural gas stream, an associated gas stream, a refinery gas stream, a petrochemical plant gas stream, and an air stream.

35. The process of claim 30, wherein the second gas is carbon dioxide and the gaseous hydrocarbon is methane.

36. The process of claim 30, wherein the second gas is carbon dioxide and the gaseous hydrocarbon is a $C_{3+}$ hydrocarbon.

37. The process of claim 30, wherein the second gas is nitrogen and the gaseous hydrocarbon is a butane.

38. The process of claim 30, wherein the second gas is air and the gaseous hydrocarbon is a volatile organic compound.

39. A process for treating a gas mixture comprising a gaseous hydrocarbon and a second gas, the process comprising:
   (a) providing a first membrane unit containing a first membrane having a first feed side and a first permeate side, the first membrane being selective in favor of the gaseous hydrocarbon over the second gas;
   (b) providing a second membrane unit containing a second membrane having a second feed side and a second permeate side, the second membrane being selective in favor of the second gas over the gaseous hydrocarbon, and including a selective layer comprising a polymer comprising repeating units having a fluorinated cyclic structure of an at least 5-member ring, the polymer having a fractional free volume no greater than about 0.3;
   the second membrane unit being connected in series with the first membrane unit such that gas leaving the first permeate side can enter the second membrane unit on the second feed side;
   (c) passing the gas mixture into the first membrane unit and across the first feed side;
   (d) providing a first driving force for transmembrane permeation;
   (e) withdrawing from the first feed side a first residue stream depleted in the gaseous hydrocarbon compared with the gas mixture;
   (f) withdrawing from the first permeate side a first permeate stream enriched in the gaseous hydrocarbon compared with the gas mixture;
   (g) passing the first permeate stream into the second membrane unit and across the second feed side;
   (h) providing a second driving force for transmembrane permeation;
   (i) withdrawing from the second feed side a second residue stream depleted in the second gas compared with the first permeate stream;
   (j) withdrawing from the second permeate side a second permeate stream enriched in the second gas compared with the first permeate stream.

40. The process of claim 39, wherein the second gas is selected from the group consisting of hydrogen, nitrogen, oxygen, methane and carbon dioxide.

41. The process of claim 40, wherein the gas mixture is selected from the group consisting of a natural gas stream, an associated gas stream, a refinery gas stream, a petrochemical plant gas stream, and an air stream.

42. The process of claim 40, wherein the second gas is nitrogen and the gaseous hydrocarbon is a $C_{3+}$ hydrocarbon.

43. The process of claim 40, wherein the second gas is nitrogen and the gaseous hydrocarbon is methane.

44. The process of claim 40, wherein the second gas is hydrogen and the gaseous hydrocarbon is a $C_{2+}$ hydrocarbon.

45. The process of claim 39, wherein the gaseous hydrocarbon is selected from the group consisting of methane, ethylene, ethane and $C_{3+}$ hydrocarbons.

46. The process of claim 39, wherein the polymer is formed from a monomer selected from the group consisting of fluorinated dioxoles, fluorinated dioxolanes, fluorinated cyclically polymerizable alkyl ethers and perfluorinated polyimides.

47. A process for treating a gas mixture comprising a gaseous hydrocarbon and a second gas, the process comprising:
   (a) providing a first membrane unit containing a first membrane having a first feed side and a first permeate side, the first membrane being selective in favor of the gaseous hydrocarbon over the second gas;
   (b) providing a second membrane unit containing a second membrane having a second feed side and a second permeate side, the second membrane being selective in favor of the second gas over the gaseous hydrocarbon, and including a selective layer comprising a polymer having:
      (i) a ratio of fluorine to carbon atoms in the polymer greater than 1:1;
      (ii) a fractional free volume no greater than about 0.3; and
      (iii) a glass transition temperature of at least about 100° C.;
      and the second membrane being characterized by a post-exposure selectivity for the second gas over the gaseous hydrocarbon, after exposure of the separation membrane to liquid toluene and subsequent drying, that is at least about 65% of a pre-exposure selectivity for the second gas over the gaseous hydrocarbon, as measured pre- and post-exposure with a test gas mixture of the same composition and under like conditions;
      the second membrane unit being connected in series with the first membrane unit such that gas leaving the first permeate side can enter the second membrane unit on the second feed side;
   (c) passing the gas mixture into the first membrane unit and across the first feed side;
   (d) providing a first driving force for transmembrane permeation;
   (e) withdrawing from the first feed side a first residue stream depleted in the gaseous hydrocarbon compared with the gas mixture;
   (f) withdrawing from the first permeate side a first permeate stream enriched in the gaseous hydrocarbon compared with the gas mixture;
   (g) passing the first permeate stream into the second membrane unit and across the second feed side;
   (h) providing a second driving force for transmembrane permeation;
   (i) withdrawing from the second feed side a second residue stream depleted in the second gas compared with the first permeate stream;
   (j) withdrawing from the second permeate side a second permeate stream enriched in the second gas compared with the first permeate stream.

48. The process of claim 47, wherein the second gas is selected from the group consisting of hydrogen, nitrogen, oxygen, methane and carbon dioxide.

49. The process of claim 47, wherein the gaseous hydrocarbon is selected from the group consisting of methane, ethylene, ethane and $C_{3+}$ hydrocarbons.

50. The process of claim 47, wherein the polymer is formed from a monomer selected from the group consisting of fluorinated dioxoles, fluorinated dioxolanes, fluorinated cyclically polymerizable alkyl ethers and perfluorinated polyimides.

51. The process of claim 47, wherein the gas mixture is selected from the group consisting of a natural gas stream, an associated gas stream, a refinery gas stream, a petrochemical plant gas stream, and an air stream.

52. The process of claim 47, wherein the second gas is nitrogen and the gaseous hydrocarbon is a $C_{3+}$ hydrocarbon.

53. The process of claim 47, wherein the second gas is nitrogen and the gaseous hydrocarbon is methane.

54. The process of claim 47, wherein the second gas is hydrogen and the gaseous hydrocarbon is a $C_{2+}$ hydrocarbon.

55. A process for treating a gas mixture comprising a gaseous hydrocarbon and a second gas, the process comprising:
(a) providing a first membrane unit containing a first membrane having a first feed side and a first permeate side, the first membrane being selective in favor of the second gas over the gaseous hydrocarbon, and including a selective layer comprising a polymer comprising repeating units having a fluorinated cyclic structure of an at least 5-member ring, the polymer having a fractional free volume no greater than about 0.3;
(b) providing a second membrane unit containing a second membrane having a second feed side and a second permeate side, the second membrane being selective in favor of the gaseous hydrocarbon over the second gas; the second membrane unit being connected in series with the first membrane unit such that gas leaving the first permeate side can enter the second membrane unit on the second feed side;
(c) passing the gas mixture into the first membrane unit and across the first feed side;
(d) providing a first driving force for transmembrane permeation;
(e) withdrawing from the first feed side a first residue stream depleted in the second gas compared with the gas mixture;
(f) withdrawing from the first permeate side a first permeate stream enriched in the second gas compared with the gas mixture;
(g) passing the first permeate stream into the second membrane unit and across the second feed side;
(h) providing a second driving force for transmembrane permeation;
(i) withdrawing from the second feed side a second residue stream depleted in the gaseous hydrocarbon compared with the first permeate stream;
(j) withdrawing from the second permeate side a second permeate stream enriched in the gaseous hydrocarbon compared with the first permeate stream.

56. The process of claim 55, wherein the second gas is selected from the group consisting of hydrogen, nitrogen, oxygen, methane and carbon dioxide.

57. The process of claim 55, wherein the gaseous hydrocarbon is selected from the group consisting of methane, ethylene, ethane and $C_{3+}$ hydrocarbons.

58. The process of claim 55, wherein the polymer is formed from a monomer selected from the group consisting of fluorinated dioxoles, fluorinated dioxolanes, fluorinated cyclically polymerizable alkyl ethers and perfluorinated polyimides.

59. The process of claim 55, wherein the gas mixture is selected from the group consisting of a natural gas stream, an associated gas stream, a refinery gas stream, a petrochemical plant gas stream, and an air stream.

60. The process of claim 55, wherein the second gas is nitrogen and the gaseous hydrocarbon is methane.

61. A process for treating a gas mixture comprising a gaseous hydrocarbon and a second gas, the process comprising:
(a) providing a first membrane unit containing a first membrane having a first feed side and a first permeate side, the first membrane being selective in favor of the second gas over the gaseous hydrocarbon, and including a selective layer comprising a polymer having:
  (i) a ratio of fluorine to carbon atoms in the polymer greater than 1:1;
  (ii) a fractional free volume no greater than about 0.3; and
  (iii) a glass transition temperature of at least about 100° C.;
  and the first membrane being characterized by a post-exposure selectivity for the second gas over the gaseous hydrocarbon, after exposure of the separation membrane to liquid toluene and subsequent drying, that is at least about 65% of a pre-exposure selectivity for the second gas over the gaseous hydrocarbon, as measured pre- and post-exposure with a test gas mixture of the same composition and under like conditions;
(b) providing a second membrane unit containing a second membrane having a second feed side and a second permeate side, the second membrane being selective in favor of the gaseous hydrocarbon over the second gas; the second membrane unit being connected in series with the first membrane unit such that gas leaving the first permeate side can enter the second membrane unit on the second feed side;
(c) passing the gas mixture into the first membrane unit and across the first feed side;
(d) providing a first driving force for transmembrane permeation;
(e) withdrawing from the first feed side a first residue stream depleted in the second gas compared with the gas mixture;
(f) withdrawing from the first permeate side a first permeate stream enriched in the second gas compared with the gas mixture;
(g) passing the first permeate stream into the second membrane unit and across the second feed side;
(h) providing a second driving force for transmembrane permeation;
(i) withdrawing from the second feed side a second residue stream depleted in the gaseous hydrocarbon compared with the first permeate stream;
(j) withdrawing from the second permeate side a second permeate stream enriched in the gaseous hydrocarbon compared with the first permeate stream.

62. The process of claim 61, wherein the second gas is selected from the group consisting of hydrogen, nitrogen, oxygen, methane and carbon dioxide.

63. The process of claim 61, wherein the gaseous hydrocarbon is selected from the group consisting of methane, ethylene, ethane and $C_{3+}$ hydrocarbons.

64. The process of claim 61, wherein the polymer is formed from a monomer selected from the group consisting of fluorinated dioxoles, fluorinated dioxolanes, fluorinated cyclically polymerizable alkyl ethers and perfluorinated polyimides.

65. The process of claim 61, wherein the gas mixture is selected from the group consisting of a natural gas stream, an associated gas stream, a refinery gas stream, a petrochemical plant gas stream, and an air stream.

66. The process of claim 61, wherein the second gas is nitrogen and the gaseous hydrocarbon is methane.

* * * * *

UNITED STATES PATENT AND TRADEMARK OFFICE
CERTIFICATE OF CORRECTION

PATENT NO.    : 6,572,679 B2
DATED         : June 3, 2003
INVENTOR(S)   : Richard W. Baker et al.

It is certified that error appears in the above-identified patent and that said Letters Patent is hereby corrected as shown below:

<u>Column 1,</u>
Line 5, please insert:
-- This invention was made in part with Government support under award number DE-FG03-97ER82429, awarded by the Department of Energy. The Government has certain rights in this invention. --

Signed and Sealed this

Twenty-second Day of July, 2003

JAMES E. ROGAN
*Director of the United States Patent and Trademark Office*